US008843459B1

(12) United States Patent
Aston et al.

(10) Patent No.: US 8,843,459 B1
(45) Date of Patent: Sep. 23, 2014

(54) MULTI-TIERED FILESYSTEM

(75) Inventors: Christopher J. Aston, Bucks (GB);
Mark Stephen Laker, Eastleigh (GB);
Trevor E. Willis, Burckinghamshire
(GB); Neil Berrington, San Jose, CA
(US); Martin A. Dorey, San Jose, CA
(US); Carlo F. Garbagnati, San Jose,
CA (US); Shmuel Shottan, Sunnyvale,
CA (US)

(73) Assignee: **Hitachi Data Systems Engineering UK
Limited**, Bracknell, Berkshire (GB)

( * ) Notice: Subject to any disclaimer, the term of this patent is extended or adjusted under 35 U.S.C. 154(b) by 0 days.

(21) Appl. No.: 13/043,837

(22) Filed: Mar. 9, 2011

Related U.S. Application Data

(60) Provisional application No. 61/311,856, filed on Mar. 9, 2010, provisional application No. 61/347,865, filed on May 25, 2010.

(51) Int. Cl.
*G06F 17/00* (2006.01)
*G06F 17/30* (2006.01)

(52) U.S. Cl.
CPC .............................. *G06F 17/30067* (2013.01)
USPC ........... 707/694; 707/822; 711/161; 711/162; 714/746; 709/223; 709/224

(58) Field of Classification Search
CPC .............. G06F 17/30067; G06F 17/30011; G06F 11/1435; G11B 27/105; G11B 27/034; G11B 27/329
USPC ................ 707/694, 821, 822, 823, 828, 831, 707/E17.007, E17.01; 711/114, 115, 165, 711/170; 714/746; 709/223, 224
See application file for complete search history.

(56) References Cited

U.S. PATENT DOCUMENTS

| | | | |
|---|---|---|---|
| 5,018,060 A | 5/1991 | Gelb et al. | |
| 5,287,500 A | 2/1994 | Stoppani, Jr. | |
| 6,289,471 B1 * | 9/2001 | Gordon | 714/6.12 |
| 6,425,034 B1 | 7/2002 | Steinmetz et al. | 710/129 |
| 6,446,141 B1 | 9/2002 | Nolan et al. | 710/8 |
| 6,496,914 B1 | 12/2002 | Vook et al. | 710/170 |
| 6,738,854 B2 | 5/2004 | Hoese et al. | 710/305 |
| 6,804,627 B1 | 10/2004 | Marokhovsky et al. | 702/182 |
| 6,839,803 B1 * | 1/2005 | Loh et al. | 711/113 |
| 6,898,634 B2 | 5/2005 | Collins et al. | 709/226 |
| 6,938,123 B2 | 8/2005 | Willis et al. | 711/114 |
| 6,950,833 B2 | 9/2005 | Costello et al. | 709/201 |
| 7,062,516 B2 | 6/2006 | Bhat | 707/202 |
| 7,062,624 B2 | 6/2006 | Kano | |
| 7,093,158 B2 * | 8/2006 | Barron et al. | 711/114 |
| 7,237,021 B2 * | 6/2007 | Penny et al. | 711/112 |

(Continued)

OTHER PUBLICATIONS

Harold C. Lim, Shivnath Babu, and Jeffrey S. Chase—"Automated control for elastic storage"—Proceeding ICAC'10 Proceedings of the 7th international conference on Autonomic computing pp. 1-10.*

(Continued)

*Primary Examiner* — Anh Ly

(74) *Attorney, Agent, or Firm* — Sunstein Kann Murphy & Timbers LLP

(57) ABSTRACT

A multi-tiered filesystem integrates multiple types of storage devices into a contiguous filesystem storage space having regions associated with two or more tiers of storage.

39 Claims, 15 Drawing Sheets

(56) References Cited

U.S. PATENT DOCUMENTS

| | | | |
|---|---|---|---|
| 7,434,017 B2* | 10/2008 | Maruyama et al. | 711/165 |
| 7,509,409 B2 | 3/2009 | Penny et al. | 709/223 |
| 7,590,671 B2* | 9/2009 | Achiwa | 707/822 |
| 7,590,672 B2* | 9/2009 | Slik et al. | 707/999.205 |
| 7,596,587 B2 | 9/2009 | Berkhin et al. | |
| 7,694,191 B1 | 4/2010 | Bono et al. | 714/48 |
| 7,734,954 B2 | 6/2010 | Davis et al. | 714/15 |
| 7,873,619 B1* | 1/2011 | Faibish et al. | 707/705 |
| 7,930,502 B2* | 4/2011 | Shimada et al. | 711/163 |
| 7,949,637 B1* | 5/2011 | Burke | 707/655 |
| 8,046,537 B2* | 10/2011 | Carr et al. | 711/117 |
| 8,095,577 B1* | 1/2012 | Faibish et al. | 707/823 |
| 8,315,995 B1* | 11/2012 | Levy | 707/694 |
| 8,321,645 B2* | 11/2012 | Rabii et al. | 711/165 |
| 8,429,346 B1* | 4/2013 | Chen et al. | 711/114 |
| 2001/0034795 A1 | 10/2001 | Moulton et al. | 709/244 |
| 2002/0031230 A1* | 3/2002 | Sweet et al. | 380/278 |
| 2002/0062387 A1 | 5/2002 | Yatziv | 709/236 |
| 2002/0069324 A1 | 6/2002 | Gerasimov et al. | 711/114 |
| 2002/0099906 A1 | 7/2002 | Chan et al. | 711/111 |
| 2002/0143942 A1 | 10/2002 | Li et al. | 709/225 |
| 2002/0184439 A1 | 12/2002 | Hino et al. | 711/112 |
| 2003/0046270 A1 | 3/2003 | Leung et al. | 707/1 |
| 2003/0135609 A1 | 7/2003 | Carlson et al. | 709/224 |
| 2003/0145166 A1* | 7/2003 | Miwa et al. | 711/114 |
| 2003/0195903 A1 | 10/2003 | Manley et al. | 707/201 |
| 2004/0054697 A1 | 3/2004 | Tsaur et al. | 707/204 |
| 2004/0073747 A1 | 4/2004 | Lu | 711/114 |
| 2004/0133650 A1 | 7/2004 | Miloushev et al. | 709/213 |
| 2004/0193791 A1 | 9/2004 | Felton et al. | 711/112 |
| 2005/0065986 A1* | 3/2005 | Bixby et al. | 707/204 |
| 2006/0010169 A1 | 1/2006 | Kitamura | 707/200 |
| 2006/0041719 A1* | 2/2006 | Chui et al. | 711/117 |
| 2006/0064536 A1 | 3/2006 | Tinker et al. | |
| 2006/0190694 A1* | 8/2006 | Shimada et al. | 711/163 |
| 2006/0236056 A1* | 10/2006 | Nagata | 711/165 |
| 2007/0112890 A1 | 5/2007 | Murase | |
| 2007/0208788 A1 | 9/2007 | Chakravarty et al. | |
| 2007/0233868 A1* | 10/2007 | Tyrrell et al. | 709/226 |
| 2008/0140932 A1 | 6/2008 | Flynn et al. | 711/114 |
| 2008/0256183 A1* | 10/2008 | Flynn et al. | 709/204 |
| 2008/0270691 A1* | 10/2008 | Belady | 711/114 |
| 2008/0313364 A1* | 12/2008 | Flynn et al. | 711/114 |
| 2009/0070382 A1* | 3/2009 | Agrawal et al. | 707/200 |
| 2009/0089524 A1* | 4/2009 | Fujihara et al. | 711/162 |
| 2009/0100110 A1* | 4/2009 | Holtom | 707/200 |
| 2009/0100222 A1* | 4/2009 | Laker | 711/114 |
| 2009/0106255 A1* | 4/2009 | Lacapra et al. | 707/10 |
| 2009/0182785 A1* | 7/2009 | Aston et al. | 707/203 |
| 2009/0216910 A1* | 8/2009 | Duchesneau | 709/250 |
| 2009/0271412 A1* | 10/2009 | Lacapra et al. | 707/10 |
| 2009/0327180 A1 | 12/2009 | Madison, Jr. et al. | |
| 2010/0082765 A1 | 4/2010 | Murase | |
| 2010/0095164 A1 | 4/2010 | Kamei et al. | 714/48 |
| 2010/0121828 A1* | 5/2010 | Wang | 707/694 |
| 2010/0138620 A1* | 6/2010 | Jess | 711/162 |
| 2010/0199036 A1* | 8/2010 | Siewert et al. | 711/112 |
| 2010/0205390 A1* | 8/2010 | Arakawa | 711/162 |
| 2010/0235553 A1* | 9/2010 | Zimoto et al. | 710/74 |
| 2010/0281230 A1* | 11/2010 | Rabii et al. | 711/165 |
| 2011/0009991 A1* | 1/2011 | Dinicola et al. | 709/203 |
| 2011/0106863 A1* | 5/2011 | Mamidi et al. | 707/823 |
| 2011/0191445 A1* | 8/2011 | Dazzi | 709/219 |
| 2011/0208938 A1* | 8/2011 | Carr et al. | 711/165 |
| 2011/0282830 A1* | 11/2011 | Malige et al. | 707/609 |
| 2012/0260055 A1* | 10/2012 | Murase | 711/165 |
| 2013/0110893 A1* | 5/2013 | Rathi et al. | 707/827 |

OTHER PUBLICATIONS

Barnaby Malet, and Peter Pietzuch—"Resource allocation across multiple cloud data centres"—Proceeding MGC '10 Proceedings of the 8th International Workshop on Middleware for Grids, Clouds and e-Science, Article No. 5 (pp. 1-6).*

Derek Pao, and Cutson Liu—"Parallel tree search: An algorithmic approach for multi-field packet classification"—Computer Communications, vol. 30, Issue 2, Jan. 15, 2007, pp. 302-314.*

Adam Leventhal—"Flash Storage Today"—Magazine Queue—Enterprise Flash Storage—vol. 6 Issue 4, Jul./Aug. 2008 pp. 24-30.*

Prasun Gupta and Mahmoud Pegah—"A new thought paradigm: delivering cost effective and ubiquitously accessible storage with enterprise backup system via a multi-tiered storage framework"—Published in: Proceeding SIGUCCS '07 Proceedings of the 35th annual ACM SIGUCCS fall conference—pp. 146-152.*

Moshayedi et al., "Entreprise SSDs," ACM Queue, Jul./Aug. 2008, pp. 32-39.

Narayanan et al., "Migrating entreprise storage to SSDs: analysis of tradeoffs," Microsoft Research Ltd. Technical Report, MSR-TR-2008, vol. 169, Nov. 2008, 12 pages.

* cited by examiner

MULTI-TIERED FILESYSTEM

CROSS-REFERENCE TO RELATED APPLICATIONS

This patent application claims the benefit of the following United States Provisional Patent Applications, each of which is hereby incorporated herein by reference in its entirety:

U.S. Provisional Patent Application No. 61/311,856 filed Mar. 9, 2010 entitled MULTI-TIERED FILESYSTEM; and U.S. Provisional Patent Application No. 61/347,865 filed May 25, 2010 entitled MULTI-TIERED FILESYSTEM.

The present invention may be related to one or more of the following commonly-owned United States patent applications, each of which is hereby incorporated herein by reference in its entirety:

U.S. patent application Ser. No. 12/164,745 entitled Dynamic Write Balancing in a Data Storage System, which was filed on Jun. 30, 2008;

U.S. patent application Ser. No. 10/407,145 entitled Network-Attached Storage System, Device, and Method Supporting Multiple Storage Device Types, which was filed Apr. 4, 2003, now U.S. Pat. No. 7,237,021;

U.S. patent application Ser. No. 11/767,832 entitled Network-Attached Storage System, Device, and Method With Multiple Storage Tiers, which was filed Jun. 25, 2007, now U.S. Pat. No. 7,509,409;

U.S. patent application Ser. No. 12/164,730 entitled Multi-Way Checkpoints in a Data Storage System, which was filed Jun. 30, 2008;

U.S. patent application Ser. No. 09/879,798 entitled Apparatus and Method for Hardware Implementation or Acceleration of Operating System Functions, which was filed Jun. 12, 2001, now U.S. Pat. No. 6,826,615;

U.S. patent application Ser. No. 10/889,158 entitled Apparatus and Method for Hardware Implementation or Acceleration of Operating System Functions, which was filed on Jul. 12, 2004;

U.S. patent application Ser. No. 10/286,015 entitled Apparatus and Method for Hardware-Based File System, which was filed Nov. 1, 2002, now U.S. Pat. No. 7,457,822; and U.S. patent application Ser. No. 11/841,353 entitled Apparatus and Method for Hardware-Based File System, which was filed on Aug. 20, 2007 in the name of Geoffrey S. Barrall et al.

FIELD OF THE INVENTION

The present invention relates to data storage systems, and, more particularly, to a multi-tiered filesystem.

BACKGROUND

In today's information age, data storage systems often manage filesystems that include huge amounts of storage space. It is common for filesystems to include many terabytes of storage space spread over multiple storage devices.

U.S. patent application Ser. Nos. 10/407,145 and 11/767,832, which were incorporated by reference above) relate to multi-tiered storage (MTS) systems that can include different types of storage devices such as solid state storage devices (SSDs) and various types of disk drives (e.g., FibreChannel and/or SATA disk drives). In such storage systems, different types of storage devices having different storage capabilities (e.g., different storage capacities, different storage/access speeds, different reliability/cost points, etc.) may be logically divided into multiple storage tiers, using different filesystems for different tiers and using cross-filesystem links to make the multiple filesystems appear as a single filesystem. Different files may be stored in different storage tiers based on various storage criteria (e.g., based on file type, file access frequency, etc.). An exemplary MTS system offered by BlueArc Corporation is described in Asaro, T., *BlueArc Titan Intelligent Multi-Tiered Storage System*, The Enterprise Strategy Group, Inc., May 2005, which is hereby incorporated herein by reference in its entirety.

SSDs (particularly flash-based SSDs) are becoming more common in the marketplace. SSDs generally offer much better performance than physical disks, especially for random I/O, because they have no disk heads to move across a platter. However, SSDs are typically much more expensive than traditional disks and therefore are often used for high-speed cache memory rather than for primary storage of the filesystem. Generally speaking, high-speed caches are used to service read requests but not write requests, which still need to be sent to the primary storage. Also, the cache must be populated before it provides any significant benefit, and benefits can be limited under certain operational conditions, such as random access patterns in which requested data is not in the cache.

SUMMARY OF THE EXEMPLARY EMBODIMENTS

In exemplary embodiments of the present invention, the file storage system logically divides storage from multiple types of storage devices into different storage tiers and integrates storage from multiple storage tiers into a single filesystem. For convenience, such an integrated filesystem is referred to hereinafter as a "multi-tiered file system" or "MTFS." Compared to MTS technology discussed above, a MTFS is a single filesystem that integrates storage from different tiers of storage rather than tying together separate filesystems using cross-filesystem links. Compared to SSD-based caches, an SSD storage tier employed in an MTFS is used to service both read and write requests and is essentially always populated.

In accordance with one aspect of the invention there is provided a multi-tiered filesystem method for a storage system having a plurality of storage devices, wherein different storage devices may be associated with different storage characteristics. The multi-tiered filesystem method involves aggregating storage from the plurality of storage devices into a storage pool having a plurality of storage tiers, the storage tiers having different storage characteristics; allocating storage from a plurality of the storage tiers for a multi-tiered filesystem; aggregating the allocated storage into a contiguous filesystem storage space such that at least two regions of the contiguous filesystem storage space are associated with different storage tiers; and for storing a particular quantum of data, selecting a storage tier for the quantum of data; allocating, from the contiguous filesystem storage space, at least one block of storage from at least one region associated with the selected storage tier; and storing the quantum of data in the at least one allocated storage block.

In accordance with another aspect of the invention there is provided a file storage system having a plurality of storage devices including storage devices associated with different storage characteristics and a file server operably coupled to the plurality of storage devices. The file server is configured to aggregate storage from the plurality of storage devices into a storage pool having a plurality of storage tiers having different storage characteristics, allocate storage from a plurality of the storage tiers for a multi-tiered filesystem, aggregate the allocated storage into a contiguous filesystem storage space such that at least two regions of the contiguous filesystem storage space are associated with different storage tiers, and for storing a particular quantum of data, select a storage tier for the quantum of data; allocate, from the contiguous filesystem storage space, at least one storage block of storage from at least one region associated with the selected storage tier; and store the quantum of data in the at least one allocated storage block.

In various alternative embodiments, the storage tiers may be based on different storage device media (e.g., solid state storage and at least one type of disk storage), different storage device speeds, and/or different storage device reliabilities. The storage tiers may include a high-speed storage tier and at least one lower-speed storage tier. Additionally or alternatively, the storage tiers may include a high-reliability storage tier and at least one lower-reliability storage tier.

In further alternative embodiments, the at least two regions of the contiguous filesystem storage space may include at least one metadata region predominantly used for storing metadata and at least one user data region predominantly used for storing user data. The at least one metadata region may be associated with solid state storage devices and the at least one user data region may be associated with disk storage devices. Additionally or alternatively, the at least one metadata region may be associated with high-reliability disk storage devices and the at least one user data region may be associated with lower-reliability disk storage devices. The method may further involve storing system metadata associated with the multi-tiered filesystem in blocks of storage associated with the at least one metadata region and, for each of a first number of user files having user metadata and user data, storing the user metadata for the user file in blocks of storage associated with the at least one metadata region and storing the user data for the user file in blocks of storage associated with the at least one user data region. The method may further involve selectively storing a portion of system metadata in blocks of data associated with the at least one user data region when there is insufficient storage space in the at least one metadata region for storing the portion of system metadata. The method may further involve, for each of a second number of user files, storing both the user metadata and the user data for the user file in storage blocks associated with the at least one metadata region. In various embodiments, the at least one user data region may include a plurality of user data regions associated with different user data tiers, and storing the user data for the user file may involve selecting a user data tier for the user data from among the plurality of user data tiers based on a predetermined storage policy and storing the user data for the user file in blocks of storage associated with the selected user data tier. The method may involve, for each of a third number of user files, storing the user metadata and the user data for the user file in blocks of storage associated with different user data tiers, wherein the user data tier in which the user metadata is stored is associated with a hierarchically higher storage tier than the user data tier in which the user data is stored. The method may further involve, for each of a fourth number of user files, storing the user metadata and the user data for the user file in blocks of storage associated with the same user data tier.

In further embodiments, data may be migrated between storage tiers based on a predetermined migration policy.

In still further embodiments, the multi-tiered filesystem may be managed using a hierarchy of virtual storage constructs including system drives, ranges composed of one or more system drives, stripesets composed of one or more ranges, and spans composed of one or more stripesets, and wherein the storage tiers are managed at the stripeset level such that each stripeset is associated with a storage tier and the multi-tiered filesystem integrates storage from stripesets associated with multiple storage tiers.

In accordance with another aspect of the invention there is provided a method for converting a single-tiered filesystem into a multi-tiered filesystem, where the single-tiered filesystem stores filesystem metadata and user files in disk storage representing a first storage tier. The method involves allocating storage for the filesystem from a pool of solid state storage, the allocated storage representing a second storage tier; aggregating the allocated storage and the disk storage into a contiguous filesystem storage space such that at least two regions of the contiguous filesystem storage space are associated with different storage tiers; and upon creation of a new user file by the filesystem, storing user metadata associated with the new user file in the solid state storage and storing user data associated with the new user file in the disk storage, so that at least one user file remains stored entirety in disk storage and the new user file is split between the disk storage and the solid state storage.

In various alternative embodiments, the method may further involve selectively migrating filesystem metadata from the disk storage to the solid state storage and/or selectively converting a user file stored entirely in disk storage to a user file split between disk storage and solid state storage, such converting including moving at least a portion of the user metadata associated with the user file to the solid state storage. Such converting may be performed, for example, upon a write to the user file and/or upon a user access to the user file.

In accordance with another aspect of the invention there is provided a file server having a storage pool including storage from at least two tiers of storage devices of different storage characteristics and also having a plurality of multi-tiered filesystems, each multi-tiered filesystem including storage from a plurality of the storage tiers aggregated into a contiguous filesystem storage space such that at least two regions of the contiguous filesystem storage space are associated with different storage tiers.

In alternative embodiments, each multi-tiered filesystem may be configured to selectively store filesystem metadata and user metadata in a first storage tier and to selectively store user data in a second storage tier.

Additional embodiments may be disclosed and claimed.

BRIEF DESCRIPTION OF THE DRAWINGS

The foregoing features of the invention will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
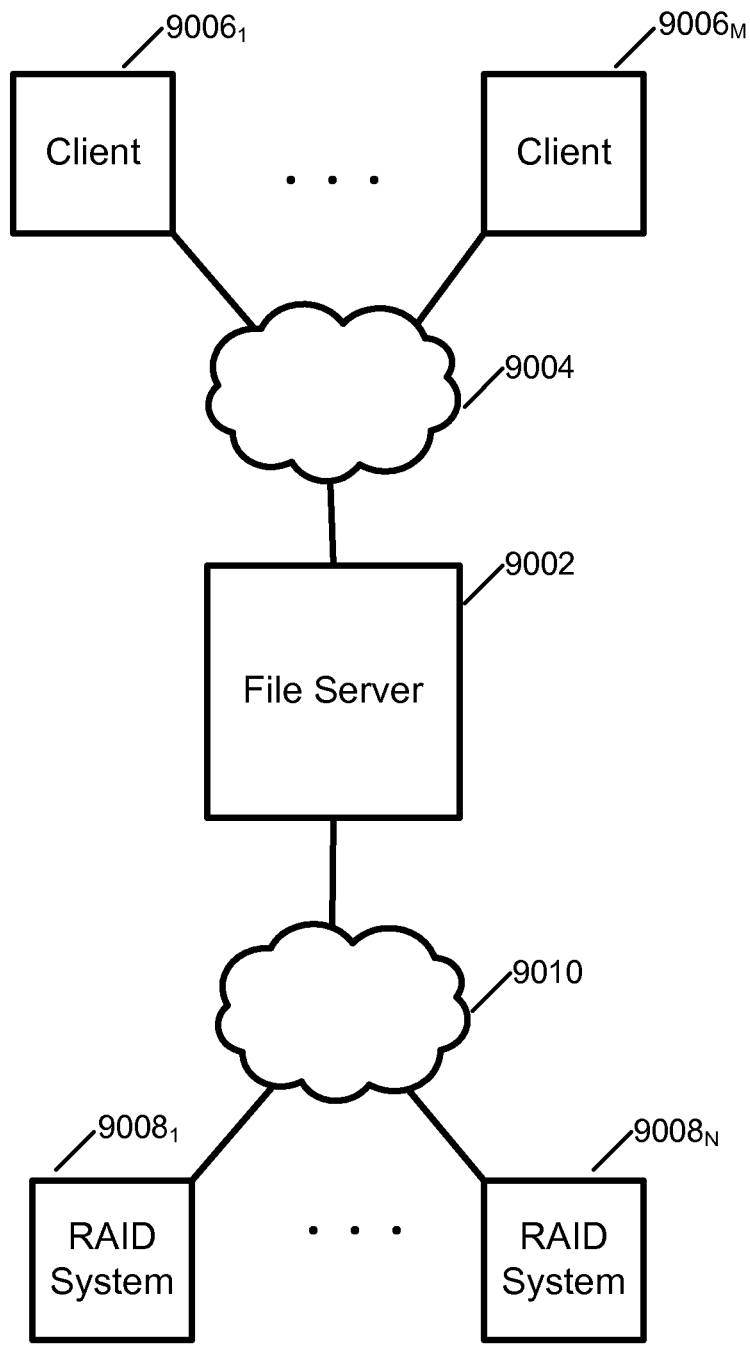
FIG. 1 is a schematic block diagram of a file storage system in accordance with an exemplary embodiment of the present invention.

Definitions: As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. The terms "file system" and "filesystem" are often used herein interchangeably, although in certain contexts, the term "file system" may refer to an overall file storage system that can include one or more filesystems.

A "range" is composed of either a primary SD on its own or a primary/secondary SD pair that are supposed to contain identical data and therefore offer the same storage capacity as a single SD.

A "stripeset" is composed of one or more ranges. Once created, a stripeset never changes its size or (normally) its makeup.

A "span" (sometimes referred to as a "storage pool") is composed of one or more stripesets. A span contains exactly one stripeset when first created, and another stripeset is added each time the span is expanded. New stripesets can be added at any time, but they cannot be removed. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span can be independently formatted, mounted, unmounted, and checked separately. Filesystems may be created and deleted in any order and at any time. Filesystems can be configured to expand automatically (or alternatively to prevent or restrict auto-expansion) or can be expanded manually.

Each stripeset is divided into a whole number of chunks. A chunk is a piece of disk space taken equitably from all the SDs in a stripeset (i.e., a chunk is a subdivision of a stripeset, rather than of an SD or a span). Chunks are typically between a few gigabytes and a few hundred gigabytes in size, and a stripeset typically holds dozens or hundreds of chunks. Each chunk is striped in such a way that sequential input/output (I/O) to the chunk would cause I/O to take place to all the stripeset's SDs at once. When a new filesystem is created, at least one whole chunk is allocated to it, and as it expands, further whole chunks are added. Every filesystem occupies a whole number of chunks, and chunks are never shared between filesystems. In the general case, some of a stripeset's chunks will be used in filesystems, while others will be free. When a stripeset is first created, all its chunks are free. Chunks become used as filesystems are created and expanded, and become free again if filesystems are deleted. Typically, the chunks in a file system do not all come from the same stripeset; this further increases the number of SDs to which I/O takes place when the file system is used, thus widening the storage bottleneck.

Sometimes, multiple SDs reside on the same set of physical disks. Storage vendors variously call this set of disks a "RAID group" or a "volume group." In order to reduce head movement and therefore reduce latency, it is desirable for the server to avoid writing simultaneously to more than one SD in each RAID group. Therefore, a dynamic write balancing (DWB) scheme may be used to write to only one SD from each RAID group at any one time, for example, as described in U.S. patent application Ser. No. 12/164,745, which was incorporated by reference above). In DWB, SDs are assigned, either automatically by the Server Management Unit (SMU) or manually by the user, into SD groups that reflect the SDs' physical layout in RAID groups, and the file server uses this configuration information to write to only one SD from each RAID group at any one time.

In typical embodiments of the present invention, a small region (e.g., 1 MB) at the start and end of each SD in the span is reserved for storage of administrative information. For convenience, the region at the start of the SD is referred to as the "low admin area" and the region at the end of the SD is referred to as the "high admin area." The low admin area includes a portion that is reserved specifically for storage of configuration information (referred to herein as "configuration on disk" or "COD"). It should be noted that each SD in the span includes COD, and each SD may be mirrored separately by the RAID system.

When a span is created, a specification of the span is written to the COD region of each SD in the span. For convenience, the span specification may be referred to as "span COD." Also stored in the COD region of each SD is a filesystem catalogue (which specifies such things as the names, IDs, and confining capacity of the filesystems on the span) and a chunk table (which specifies the chunks of storage space that have been allocated to each filesystem, and in which order). For convenience, the filesystem catalogue and chunk table may be referred to as "filesystem COD." No client data is stored in the COD regions. In a "healthy" system, all SDs will have virtually identical COD, and each SD's COD will contain a description of the span and its filesystems.

With a typical filesystem, there are essentially two kinds of data, namely "user data" and "metadata." Generally speaking, user data is data that is directly visible to users, e.g., the data that users store in files. Metadata is less directly visible, but is critically important, since it tells the server such things as the names and other attributes (e.g., permissions, sizes, last-access times, etc.) of users' files, where to find each block in those files, where to write new data, and so on.

There are essentially two kinds of metadata, namely metadata regarding the filesystem itself (e.g., various types of system objects such as a root directory object, a free block bitmap object, etc.) and metadata relating to each user file. For convenience, metadata regarding the filesystem itself may be referred to herein as "system metadata," while metadata relating to user files may be referred to herein as "user metadata." It should be noted that, in the context of the subject patent application, "user metadata" is metadata generated by the filesystem with respect to a user file, such as the various nodes of a user file object tree structure as discussed more fully below. Metadata generally occupies only a small percentage of a typical filesystem, but the server generally does a disproportionately large amount of I/O to it.

System objects and user file objects may be stored using tree structures having a root node that points to various other structures, such as storage blocks that contain content, direct nodes that point to storage blocks, or indirect nodes that point to other indirect nodes or to direct nodes. For convenience, the root nodes, direct nodes, and indirect nodes are often referred to generally as "onodes." Among other things, tree structures allow objects to expand and contract, e.g., by respectively adding and removing onodes.

Multi-Tiered Filesystem (MTFS)

In embodiments of the present invention, the file storage system logically divides storage from multiple types of storage devices into different storage tiers and integrates storage from multiple storage tiers into a single filesystem. For convenience, such an integrated filesystem is referred to hereinafter as a "multi-tiered file system" or "MTFS." An MTFS can be created from scratch, or a single-tier filesystem can be converted to an MTFS (e.g., by associating the existing storage with one tier and adding storage from another tier to the filesystem, as discussed below). Because the MTFS integrates the various types of storage devices into a single filesystem space, blocks of storage in different tiers can be referenced in the same way that blocks of storage are referenced in a single-tier filesystem, e.g., using offsets, block numbers, or other references within the filesystem space.

An MTFS can be configured in different ways. For example, the storage tiers in an MTFS may be associated with different performance characteristics (e.g., a high-speed storage tier using SSDs and one or more lower-speed storage tiers using disk drives) and/or with different reliability characteristics (e.g., a high-reliability storage tier using FibreChannel disk drives and one or more lower-reliability storage tiers using less expensive but less reliable disk drives such as SATA disk drives). Thus, for example, a two-tiered MTFS might have a high-speed storage tier and low-speed storage tier or a high-reliability storage tier and low-reliability storage tier. An MTFS with more than two tiers might have storage tiers with different tiers speeds and/or reliabilities (e.g., high, medium, low) or a mixture of characteristics (e.g., a high-speed SSD top tier; a high-reliability FibreChannel disk medium tier; and a lower-reliability SATA disk bottom tier). Storage tiers may be based on other characteristics and combinations of characteristics.

Data may be stored among the various tiers based on criteria such as, but not limited to, file size, file type, data access frequency, or data importance. For example, frequently accessed data (e.g., filesystem metadata or frequently accessed files) may be stored in a high-speed storage tier with less frequently accessed data stored in a lower-speed storage tier, or critical data (e.g., metadata and critical files) may be stored in a high-reliability storage tier with less critical data stored in a lower-reliability storage tier.

Furthermore, a particular user file may be stored completely in a single storage tier (e.g., a frequently-accessed file stored in a high-speed storage tier and an infrequently-accessed file stored in a lower-speed storage tier) or may be divided among two or more storage tiers. For example, file metadata may be stored in a high-speed storage tier with the user data stored in a lower-speed storage tier. Because the file metadata typically is accessed more frequently than the user data and is smaller (in terms of storage requirements) than the user data, such division of a user file should improve file access performance while conserving precious storage space in the higher-speed storage tier.

Data may be migrated between tiers based on various migration strategies. For example, data associated with a user file may be migrated from a lower-speed storage tier to a higher-speed storage tier, e.g., as the number of accesses to the user file increases, while data associated with a user file may be migrated from a higher-speed storage tier to a lower-speed storage tier, e.g., as the number of accesses to the user file decreases. Data associated with a user file also may be migrated as the size of the file changes, e.g., the entire user file may be stored initially in a high-speed storage tier and then user data associated with the user file may be migrated to a lower-speed storage tier as the size of the user file increases (leaving the file metadata and perhaps some of the user data in the high-speed storage tier).

Exemplary MTFS Embodiments

Some exemplary embodiments of the present invention are now described with reference to a two-tier MTFS having a high-speed storage tier (e.g., composed of solid state storage such as Flash storage) and one or more lower-speed (and typically lower-cost) storage tiers (e.g., composed of Fibre-Channel and/or SATA disk drives. It should be clear, however, that the concepts described with reference to this exemplary MTFS can be more generally applied to MTFS implementations having two or more tiers based on storage speed, reliability, or other performance characteristics.

In this exemplary embodiment, metadata is stored primarily in the high-speed storage tier and user data is stored primarily stored in the lower-speed storage tier(s). Certain user data may be selectively stored in the high-speed storage tier (e.g., based on file size, file type, or file access frequency), and such user data may be migrated between tiers based on a predetermined migration strategy. Since metadata is generally accessed and updated more frequently than user data, storage of the filesystem metadata in a high-speed storage tier will generally improve filesystem performance without adding excessive costs such as would be incurred using solid-state storage for all data.

Typically, all or substantially all of the system metadata will be stored in the high-speed storage tier, and some or all of the user metadata will be stored in the high-speed storage tier. For user files, user metadata generally will be stored in the high-speed storage tier while the user data associated with the file is stored in the lower-speed storage tier.

From a performance perspective, such an MTFS configuration should provide lower latencies when accessing metadata such as fetching file attributes, reading directories, performing lookups, and other metadata-intensive operations, especially when the metadata needs to be pulled from primary storage (e.g., with "cold" caches or when file accesses are random). Thus, even though reading and writing user data typically still involves accessing the lower-speed storage, overall file access performance should improve. Also, by storing system metadata such as various bitmaps and onodes in the high-speed storage tier, MTFS should allow data to be committed to storage more quickly, since these structures will be written to the higher performance storage. This has the additional benefit of reducing the load on the lower-speed storage and consequently should improve the performance of reading from or writing to that lower-speed storage.

Because the MTFS integrates the various types of storage devices into a single filesystem space, blocks of storage in different tiers can be referenced in the same way that blocks of storage are referenced in a single-tier filesystem, e.g., using offsets, block numbers, or other references within the filesystem space. In order to store a user file across two tiers, for example, the file server will generally allocate one or more blocks of storage in the high-speed storage tier for storage of user metadata and allocate one or more blocks of storage in the lower-speed storage tier for storage of user data. Thus, for example, an onode stored in the high-speed storage tier can and often will include references to data blocks stored in a low-speed storage tier.

For a newly created MTFS, typically the system metadata will be established in the high-speed storage tier immediately, and user metadata will be established in the high-speed storage tier as user files are created. When converting a single-tier filesystem to an MTFS, system metadata may be selectively migrated to the high-speed storage tier either immediately or over time, and user metadata associated with certain existing user files (i.e., user files that meet predetermined criteria for migration to the high-speed storage tier) will be migrated to the high-speed storage tier over time, e.g., when a user file is modified or perhaps simply when the file is accessed (although the user metadata could be migrated immediately upon creation of the MTFS). Thus, in a converted MTFS, there may be some user files stored entirely in a lower-speed storage tier and some user files split between storage tiers.

Over time, one of the storage tiers may become filled such that blocks can no longer be allocated from it. Thus, when the file server attempts to allocate a block from a storage tier and the operation fails, the file server may be configured to fail the filesystem, fail the operation but keep the filesystem mounted, spill over to another storage tier (i.e., allocate a block from another storage tier, e.g., to store metadata in a lower-speed storage tier or store user data in the high-speed storage tier), increase the size of the tier (e.g., by adding additional storage capacity to the tier), or free up space in the tier (e.g., by "demoting" user metadata and/or user data stored in the high-speed storage tier to a lower-speed storage tier using a predetermined demotion scheme, e.g., based on file type, file size, file access patterns, etc.). A particular implementation need not support all of these options. When multiple of these options are implemented, the type of action to be taken by the file server is typically configurable by the user. In a representative embodiment, the default is to spill over to another tier.

The MTFS allows for support of various types of storage classes based on predetermined storage criteria. For example, certain files may be split between two tiers (the typical case for user files), certain files may be stored completely in the high-speed storage tier (e.g., "small" files or "important" files, such as files that are accessed frequently), certain files may be stored completely in a lower-speed storage tier (e.g., archived files or "unimportant" files that do not require the enhancement of multi-tiered storage), and certain files may be stored initially in the high-speed storage tier and later split between two tiers (e.g., a small file that is initially stored in the high-speed storage tiers that is split when the file size increases beyond a predetermined limit).

In certain embodiments of the present invention, storage is divided into two tiers, specifically a high-speed storage tier using solid-state storage devices (variably referred to hereinafter as "Tier 0" or "the metadata tier") and a lower-speed, less-expensive storage tier using SATA or other disk drives (variably referred to hereinafter as "Tier 1" of "the user data tier"). It should be noted that alternative embodiments may offer more tiers and may number the tiers more flexibly and may offer more flexible control over which data is stored in each tier. For example, depending on the amount of space available in each tier, a user may choose to store small, frequently-used files in a fast tier and other files in a slower tier; conversely, some users may wish to store metadata in the fastest tier, most user data in a medium-speed tier, and backups and archives in the slowest tier.

Some exemplary embodiments of a two-tiered MTFS are now described with reference to a file storage system that is based on the virtual storage constructs described above, such as certain file servers sold by BlueArc Corporation, particularly the BlueArc TITAN™ and MERCURY™ families of file server products, although it should be noted from the start that various aspects described herein can be applied more generally to other types of file storage systems.

FIG. 1 is a schematic block diagram of a file storage system in accordance with an exemplary embodiment of the present invention. Among other things, the file storage system includes a number of file servers (a single file server 9002 is shown for the sake of simplicity and convenience) in communication with various client devices $9006_1$-$9006_M$ over a communication network 9004 such as an Internet Protocol network (e.g., the Internet) and also in communication with various RAID systems $9008_1$-$9008_N$ over a storage network 9010 such as a FibreChannel network. The client devices $9006_1$-$9006_M$ and the file server 9002 communicate using one or more network file protocols, such as CIFS and/or NFS. The file server 9002 and the RAID systems $9008_1$-$9008_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 manages one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based filesystem including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 9002 is configured to use one or more SDs, which can be from a single RAID system or from multiple RAID systems. The file server 9002 can normally interrogate the RAID systems to find out whether each SD is primary or secondary. The method of controlling which SDs are used by the file server 9002 is referred to herein as "licensing." Thus, in practice, the file server 9002 will typically be licensed for some SDs and unlicensed for others.

Internally, the file server 9002 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Figure 2:
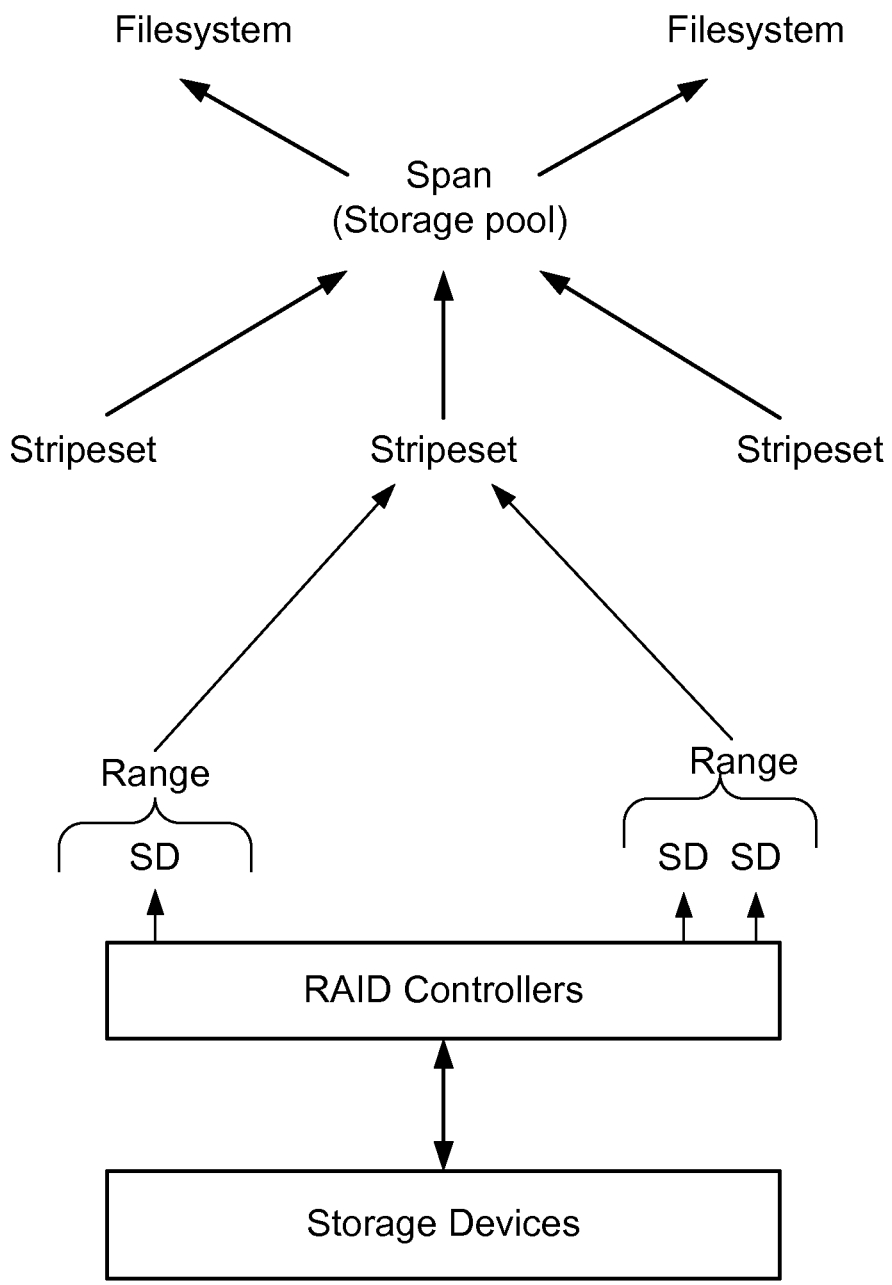
FIG. 2 is a schematic diagram showing the relationship between various virtual storage constructs in accordance with an exemplary embodiment of the present invention.

FIG. 2 is a schematic diagram showing the relationship between various virtual storage constructs in accordance with an exemplary embodiment of the present invention. As discussed above, a span is composed of a number of stripesets from which one or more filesystems are allocated. Each stripeset is composed of a number of ranges. Each range is composed of either a single SD, as represented by the range on the left-hand side of the drawing, or two SDs (where the server writes to the primary SD and the storage automatically copies the data to the mirrored secondary SD), as represented by the range on the right-hand size of the drawing. Each SD is essentially the aggregation of a number of storage devices by a RAID controller. In this exemplary embodiment, the lowest-level unit of storage that the file server 9002 encounters is a system drive (SD); for purposes of this disclosure, the file server 9002 is not concerned with anything that happens at a lower level than SDs.

Figure 3:
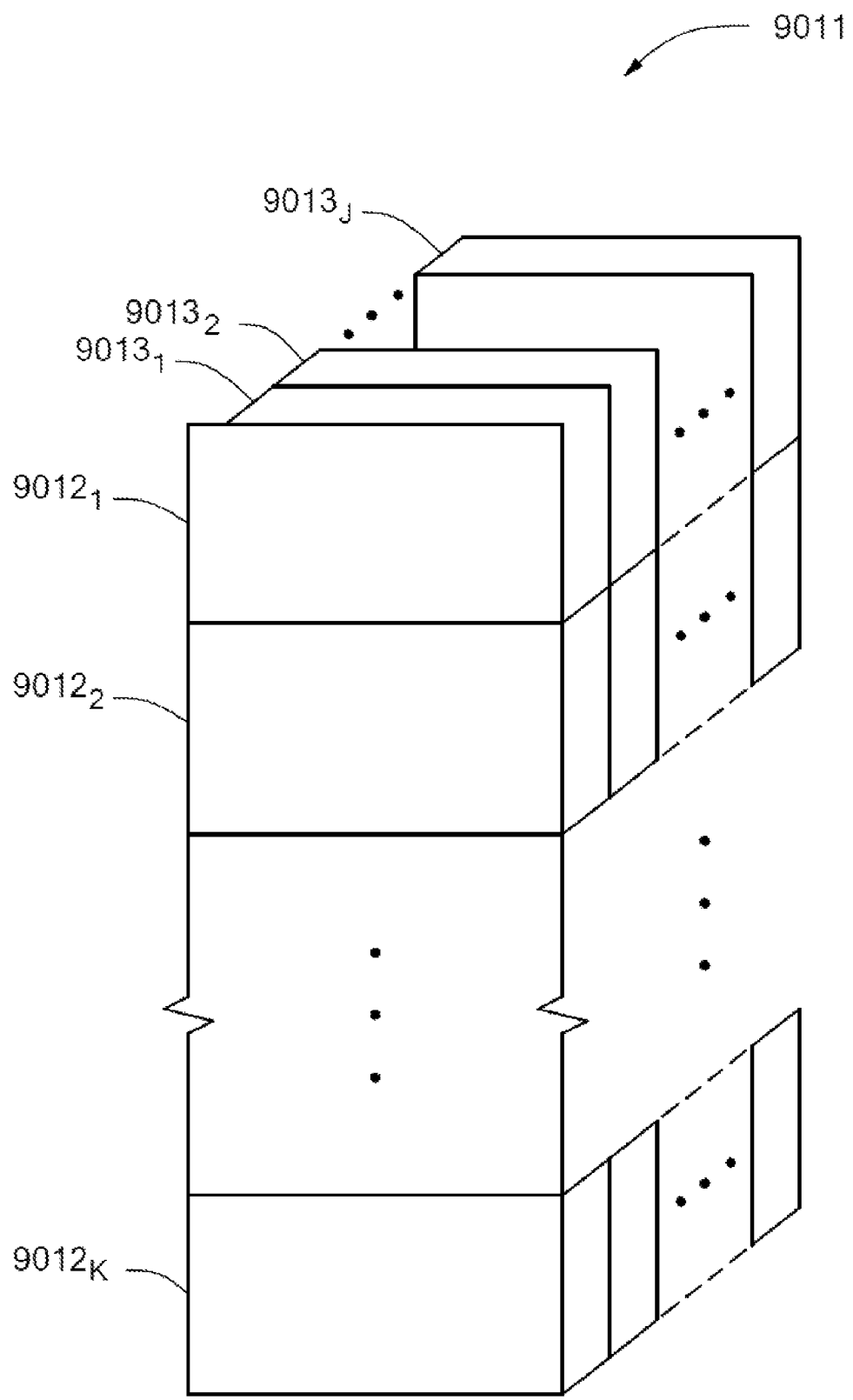
FIG. 3 is a schematic block diagram showing the general format of a filesystem in accordance with an exemplary embodiment of the present invention.

FIG. 3 is a schematic block diagram of a span in accordance with an exemplary embodiment of the present invention. As shown, the span 9011 is composed of a number of stripesets numbered $9012_1$-$9012_K$ that logically provide a contiguous storage space. Each stripeset 9012 in turn is composed of one or more ranges and therefore one or more SDs. In this example, stripeset $9012_1$ includes ranges numbered $9013_1$-$9013_J$.

When a large amount of data is written to a stripeset, the file server 9002 generally "stripes" the data across multiple ranges/SDs in the stripeset rather than writing all of the data to a single range/SD. For example, when a large amount of data is written, the file server 9002 may write the first 4 MB of data in range/SD $9013_1$, the next 4 MB of data in range/SD $9013_2$, and so on, recycling back to range/SD $9013_1$ after writing data to range/SD $9013_J$. Among other things, such "striping" increases the chances that the file server 9002 is using several SDs (and hence several storage devices), possibly managed by several RAID systems.

It should be noted that, in an exemplary embodiment, the span 9011 initially contains a single stripeset when the span is created, but additional stripesets may be added to the span over time, and different stripesets may have different numbers of ranges/SDs. In an exemplary embodiment, each stripeset can contain up to 32 SDs, regardless of their capacities. Each SD may be mirrored, but such mirroring is performed by the RAID systems rather than by the file server 9002; therefore, for mirrored SDs, the file server 9002 sends commands only to the primary SD, and only the primary SD counts towards the limit of 32 SDs per stripeset. Also, in an exemplary embodiment, once a stripeset is created, no more SDs are added to that stripeset. Therefore, in order to add SDs to the span, a new stripeset is formed for the additional SDs, and the new stripeset is essentially concatenated to the existing stripeset(s) in the span.

Thus, for example, a span initially may include a single stripeset having four SDs numbered 0-3. In order to add three new SDs numbered 5-7 to the span, a second stripeset including SDs 5-7 is created, and the second stripeset is concatenated to the first stripeset. The existing data is not "restriped" across all seven SDs in the span.

Figure 4:
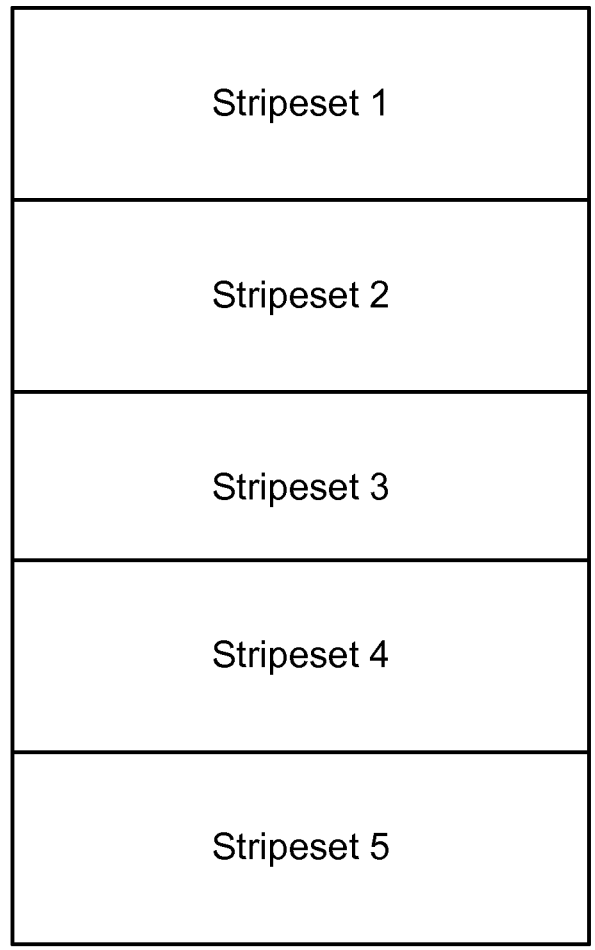
FIG. 4 is a schematic diagram showing the relationship between a span and stripesets in accordance with an exemplary embodiment of the present invention.

FIG. 4 is a schematic diagram showing the relationship between a span and stripesets in accordance with an exemplary embodiment of the present invention. In this example, the span includes five stripesets. It should be noted that there may be many millions of blocks associated with each stripeset, and the number of blocks may be different in each stripeset.

The file server 9002 stores various types of objects in the filesystem. The objects may be classified generally as system objects and user objects. User objects, such as word processor or spreadsheet files, are created for storage of user data and associated attributes. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. A software metadata object is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

An instantiation of the filesystem is managed using a tree structure having a root node (referred to as a dynamic superblock or DSB) that is stored at a known location within the filesystem. Among other things, storing the DSB at a known location facilitates location of the DSB by the file server 9002. The file server 9002 may maintain multiple DSBs to store different versions of the filesystem representing different checkpoints (e.g., a current "working" version and one or more "checkpoint" versions). In an exemplary embodiment, the DSB includes a pointer to an indirection object (described below), which in turn includes pointers to other objects.

Figure 5:
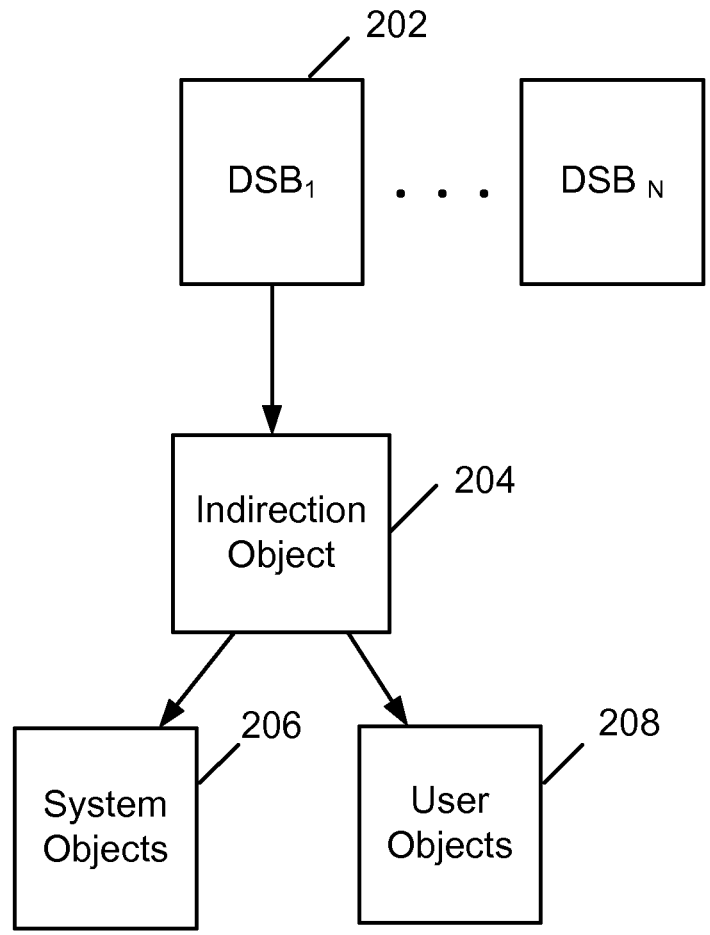
FIG. 5 is a schematic block diagram showing the general format of a filesystem in accordance with an exemplary embodiment of the present invention.

FIG. 5 is a schematic block diagram showing the general format of a filesystem instantiation in accordance with an exemplary embodiment of the present invention. The DSB 202 is a special structure that represents the root of the filesystem tree structure. Among other things, the DSB 202 includes a pointer to an indirection object 204, which in turn includes pointers to other objects in the filesystem including system objects 206 and user objects 208.

Generally speaking, each object in the filesystem, including the indirection object 204, each of the system objects 206, and each of the user objects 208, is associated with a unique object number within the filesystem and is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 6:
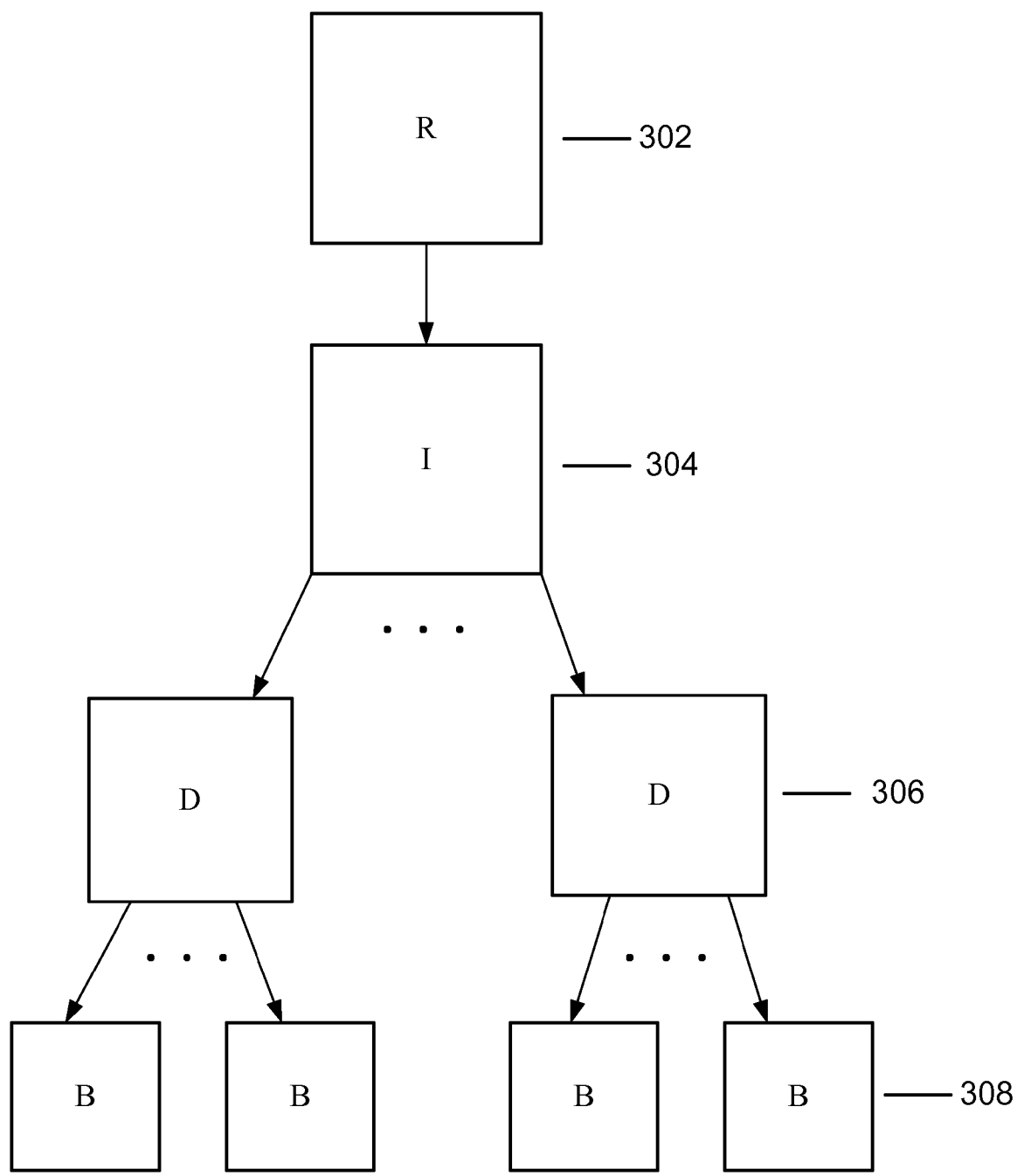
FIG. 6 is a schematic block diagram showing the general format of an object tree structure in accordance with an exemplary embodiment of the present invention.

FIG. 6 is a schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes). When an object is created, an object root node is created for the object. Initially, the root node of such an "empty" object has no pointers to any indirect nodes, direct nodes, or data blocks. As data is added to the object, data blocks, direct nodes, and indirect nodes are added as needed.

In representative embodiments of the present invention, tiers of storage are logically managed at the stripeset level. All the SDs in a stripeset are required to be assigned by the user to the same tier such that each stripeset can be considered as being in a particular tier, but different stripesets can be associated with different tiers. In an exemplary embodiment, the file server includes command line and graphical user interfaces through which users can assign SDs to tiers, and the file server enforces constraints to ensure that the SDs in each stripeset are all assigned to the same tier. A multi-tiered span will contain at least one Tier 0 stripeset and at least one Tier 1 stripeset.

Because all the SDs in any one stripeset are of the same type, each chunk (which is a subdivision of a stripeset) is taken from SDs of the same type. Each chunk therefore can be thought of as having a type of its own.

As discussed above, a span can include one or more filesystems. In essence, a filesystem can be viewed as a contiguous storage space having N sequential blocks of storage. For the sake of this discussion, the blocks can be logically numbered sequentially from 0 to N−1. In actuality, the filesystem storage space may be physically non-contiguous within the span, and may include storage from multiple stripesets. Generally speaking, the file server 9002 maps filesystem storage blocks to physical storage locations within the span. Thus, in an exemplary embodiment in which a filesystem includes storage from multiple stripesets, a first set of filesystem storage blocks will map to a first stripeset, a second set of filesystem storage blocks might map to a second stripeset, and so on.

Figure 7:
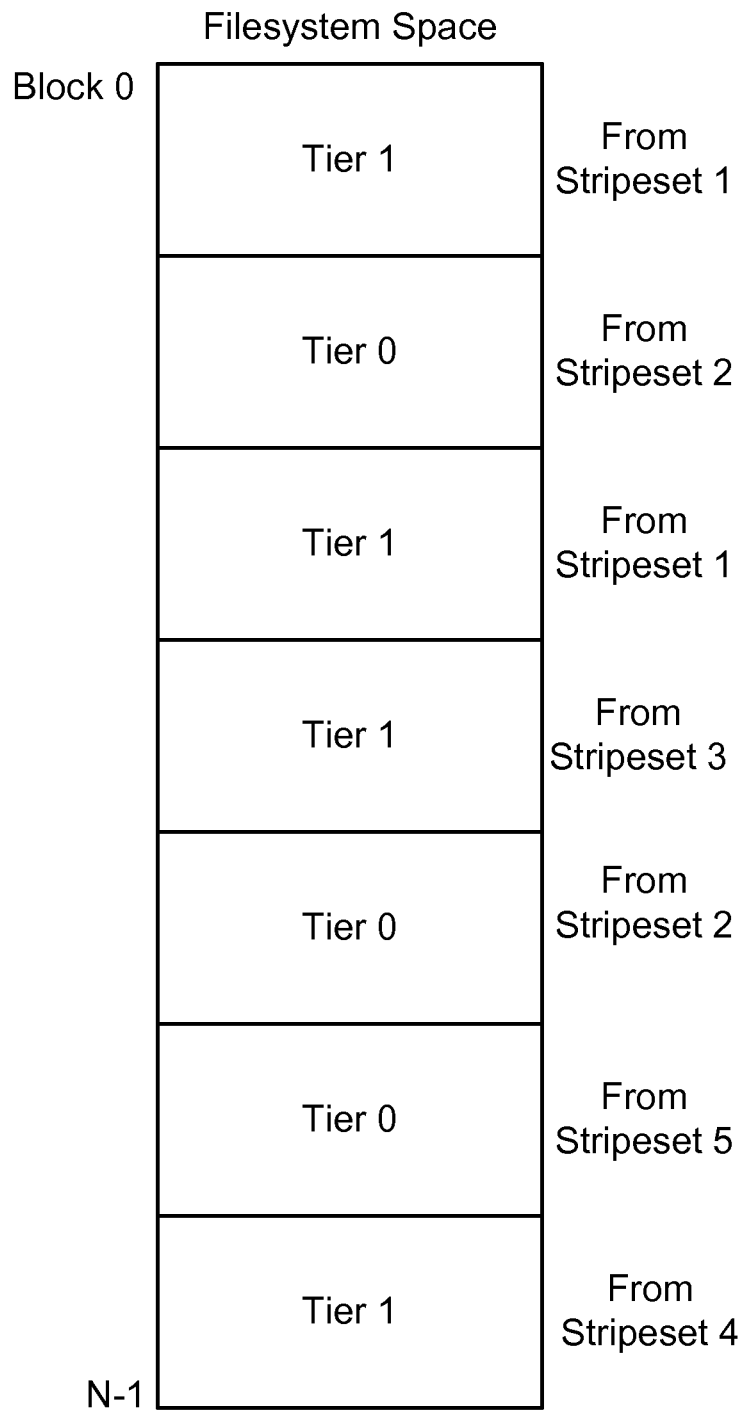
FIG. 7 shows a representation of a filesystem space in a multi-tiered file system in accordance with an exemplary embodiment of the present invention.

When a multi-tiered filesystem is created, it will draw at least some space from each tier. FIG. 7 shows a representation of a filesystem space in a MTFS in accordance with an exemplary embodiment of the present invention. In this example, the filesystem pulls storage from five stripesets. Stripesets 1, 3, and 4 have been configured as Tier 1 storage while stripesets 2 and 5 have been configured as Tier 0 storage. There is no requirement that the ranges of storage associated with a particular tier be contiguous within the filesystem space or that the tiers be arranged sequentially within the filesystem space (e.g., there is no requirement that Tier 0 storage blocks be followed by Tier 1 storage blocks).

As discussed below, filesystems can be converted from single tier to multi-tier and vice versa. For the filesystem represented in FIG. 7, the filesystem may have begun with as a single tier filesystem having blocks from stripeset 1 and been converted to a multi-tiered file system by adding a second tier of storage to the storage system (e.g., Flash storage represented by stripeset 2), associating stripeset 1 (and hence the blocks in the filesystem pulled from stripeset 1) with Tier 1, and adding blocks from stripeset 2 as Tier 0 storage. Later, additional Tier 1 and Tier 0 storage may have been added, as depicted in FIG. 7.

Within the server 9002, the subsystem responsible for combining SDs into stripesets and spans and dividing the space into filesystems (referred to as the "Span Manager") will tell the subsystem responsible for creating and managing structures of files and directories (referred to as the "File System Module" or "FSM") the start and end offsets and the tier number of each chunk of space. This will enable the FSM to allocate space in Tier 0 or Tier 1, depending on the type of allocation being made. In this exemplary embodiment, free space disk blocks are allocated by a hardware-based subsystem referred to as the "FSA" implemented using a field-programmable gate array (FPGA).

When a file system is mounted, the FSM sends the FSA chip information about the SD groups and chunks that make up the file system. The SD group information, among other data, specifies the tier on which the SD group resides. When the FSA chip is asked to allocate blocks in the file system, included in the request is information about the intended use for those blocks. The FSA chip can thus choose an appropriate tier from which to allocate blocks. The FSA chip maintains multiple allocation cursors for each file system, and for MTFS support, also maintains multiple allocation cursors per tier for each filesystem.

The FSM will store FSA's cursors on disk, so that, after a filesystem has been unmounted and remounted, FSA does not have to go back to the start of the filesystem and search large numbers of blocks containing little or no free space.

Figure 8:
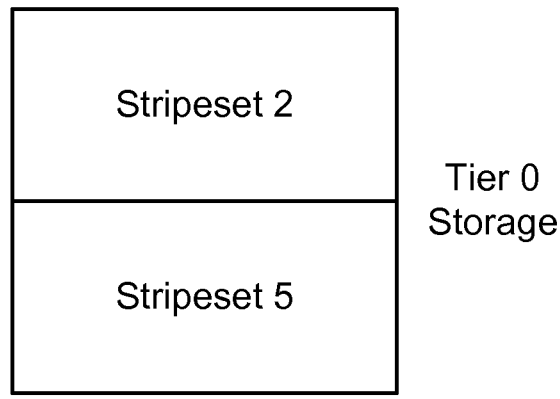
FIG. 8 shows a representation of two tiers of storage in accordance with an exemplary embodiment of the present invention.
Figure 8:
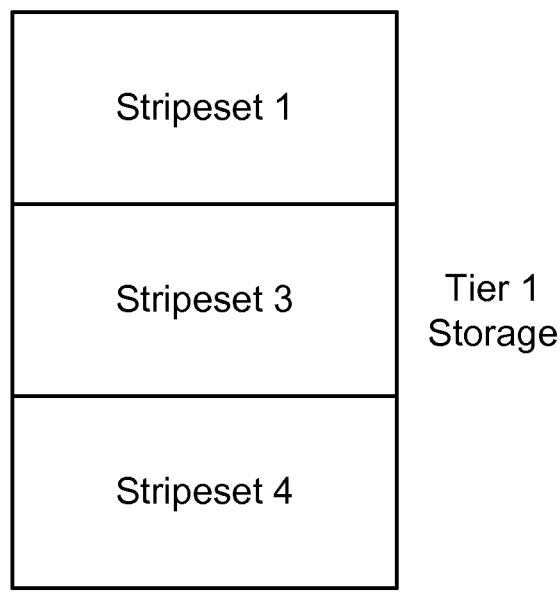

In essence, then, the file server 9002 logically tracks storage for each tier in the filesystem. FIG. 8 shows a representation of stripesets associated with Tier 0 storage and stripesets associated with Tier 1 storage for the filesystem represented in FIG. 7. Here, the Tier 0 storage includes blocks from stripesets 2 and 5 and the Tier 1 storage includes blocks from stripesets 1, 3, and 4.

Figure 9:
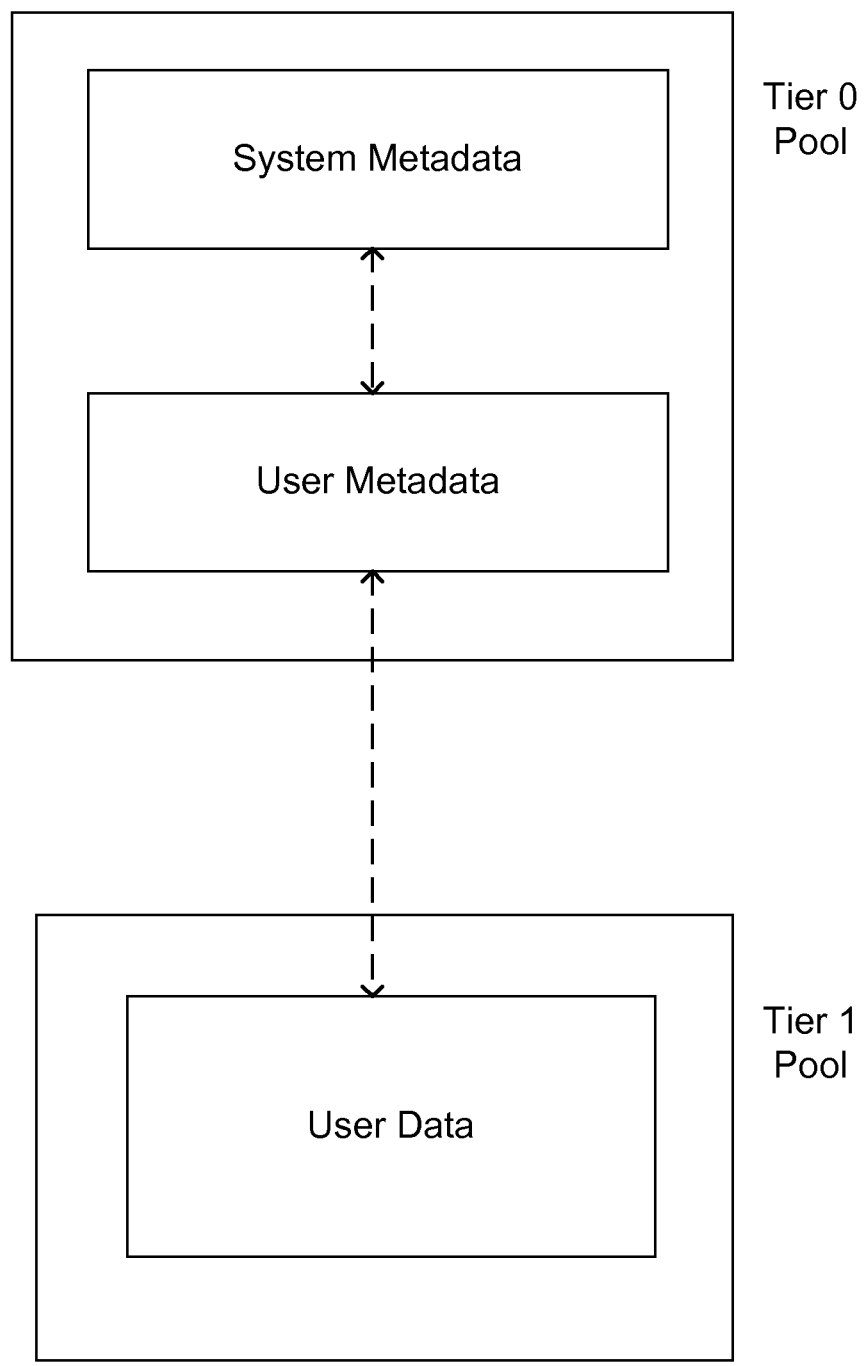
FIG. 9 shows a representation of the division of storage between two storage tiers in accordance with an exemplary embodiment of the present invention.

As discussed above, system metadata and user metadata associated with user files is typically stored in Tier 0 storage while user data associated with user files is typically stored in Tier 1 storage. This division of storage is represented in FIG. 9. As discussed more fully below, the system metadata typically includes pointers to user metadata structures (e.g., root nodes of user files) and the user metadata typically includes pointers to user data blocks, as represented by the dashed arrows.

The filesystem includes various types of system objects, including, among others, a root directory object that maps file names to their corresponding object numbers in the filesystem, a free space bit map object that indicates free storage blocks in the file storage system, a modified checkpoint objects lists object that identifies objects that have been created or modified during a checkpoint cycle, and a free blocks object that is used to keep track of data blocks that have become unused by the filesystem during a particular checkpoint. Generally speaking, system objects have fixed, predefined object numbers within the filesystem, although certain system objects may have variable object numbers. The following is a description of some system objects in an exemplary embodiment of the present invention.

A root directory object is a system object (i.e., it has a root node and a fixed predetermined object number) that maps file names to their corresponding object numbers. Thus, when a file is created, the file storage system allocates a root node for the file, assigns an object number for the file, adds an entry to the root directory object mapping the file name to the object number, and adds an entry to the indirection object mapping the object number to the disk address of the root node for the file. An entry in the indirection object maps the root directory object number to the disk address of the root directory object's root node.

Figure 10:
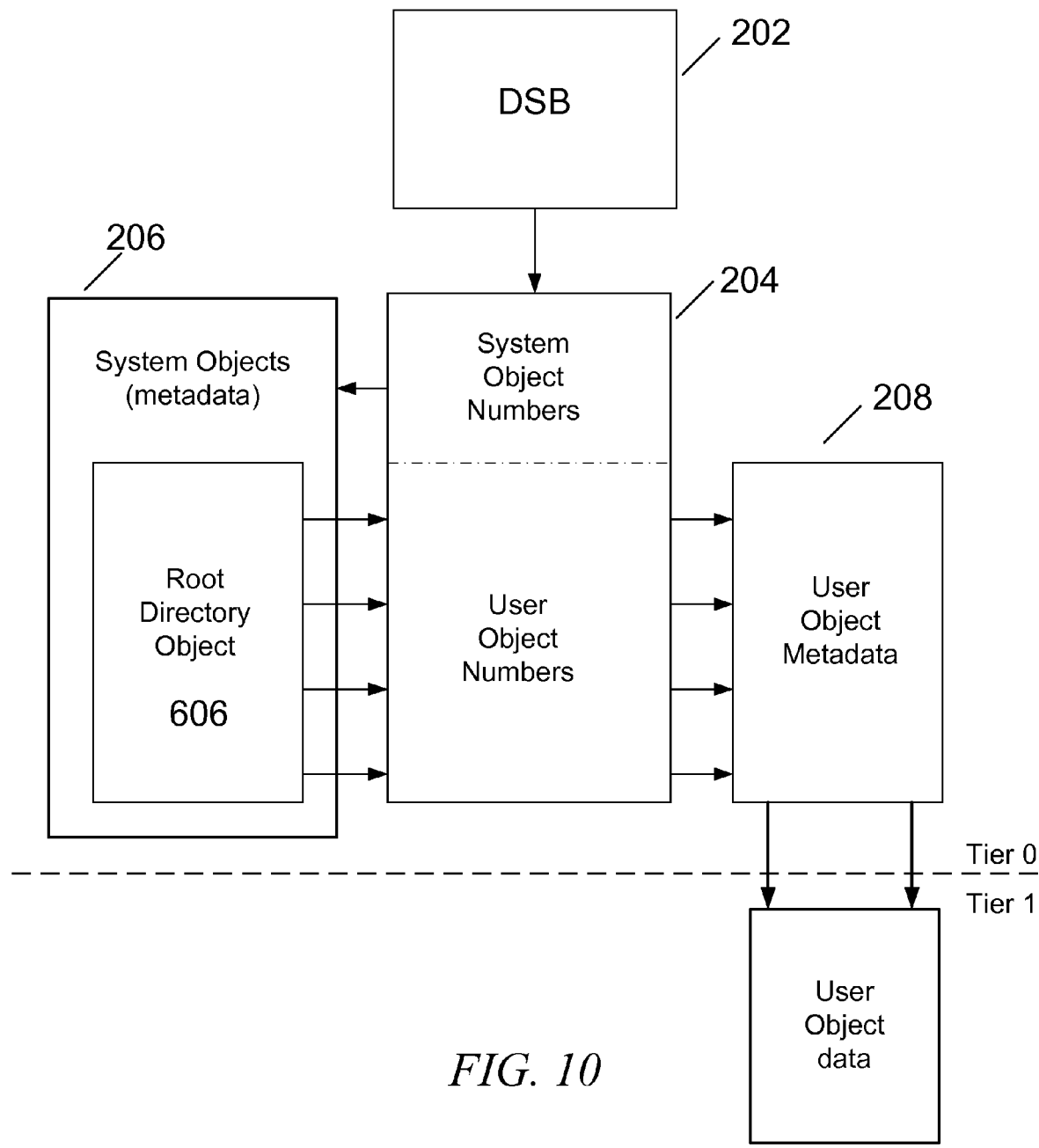
FIG. 10 is a schematic block diagram demonstrating the general relationship between the DSB, the indirection object, the system objects, and the user objects in a multi-tiered file system, in accordance with an exemplary embodiment of the present invention.

FIG. 10 is a schematic block diagram demonstrating the general relationship between the DSB 202, the indirection object 204, system objects 206, and the user objects 208 in this exemplary MTFS embodiment. As mentioned above, the DSB 202 includes a pointer to the root node of the indirection object 204. For each user object and each other system object, the indirection object 204 includes a pointer to the root node of the object, allowing access to the object based on the object number. The root directory object 606 maps file names to object numbers. Therefore, when the file server 9002 needs to locate an object based on the object's file name, the file server 9002 can locate the root directory object 606 via the indirection object (i.e., using the object number associated with the root directory object 606), map the file name to its corresponding object number using the root directory object 606, and then locate the object via the indirection object using the object number.

As discussed in U.S. patent application Ser. No. 12/164,730, which was incorporated by reference above) when a filesystem is formatted, dynamic superblocks (DSBs) are placed at known locations, which in representative embodiments are always within the first chunk of the filesystem. In an MTFS created from scratch, the DSBs (which in this embodiment reside in the first chunk of the filesystem) and the system objects (i.e., system metadata) are stored in blocks pulled from Tier 0 storage while the user objects may be split between the two tiers, with the user object metadata stored in blocks pulled from Tier 0 storage and the user object data stored in blocks pulled from Tier 1 storage. Thus, in this case, Span Manager will ensure that, on a multi-tier span, the first chunk of a new filesystem resides on Tier 0. It should be noted that in a filesystem that is converted from single tier to multi-tier, the DSBs are not moved and so it is possible for the DSBs to reside on a tier other than Tier 0, e.g., if the existing storage is associated with Tier 1 rather than Tier 0.

Figure 11:
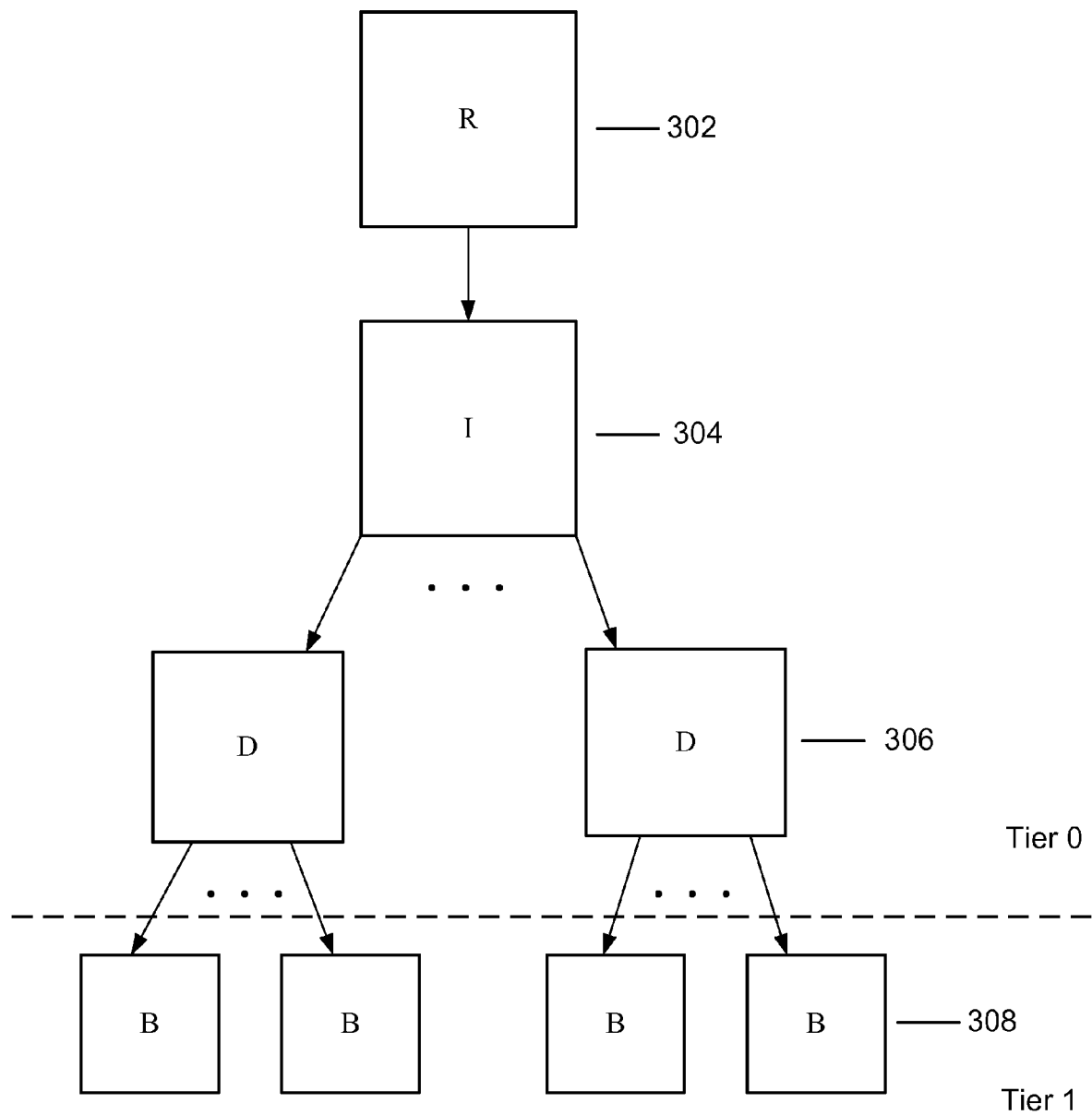
FIG. 11 shows a representation of the division of a user file object between two storage tiers in accordance with an exemplary embodiment of the present invention.

FIG. 11 shows a representation of the division of a user file object between the two storage tiers. Specifically, the root node 302 and any direct nodes 306 and indirect nodes 304 are stored blocks pulled from Tier 0 storage while the user data 308 is stored in blocks pulled from Tier 1 storage.

Figure 12:
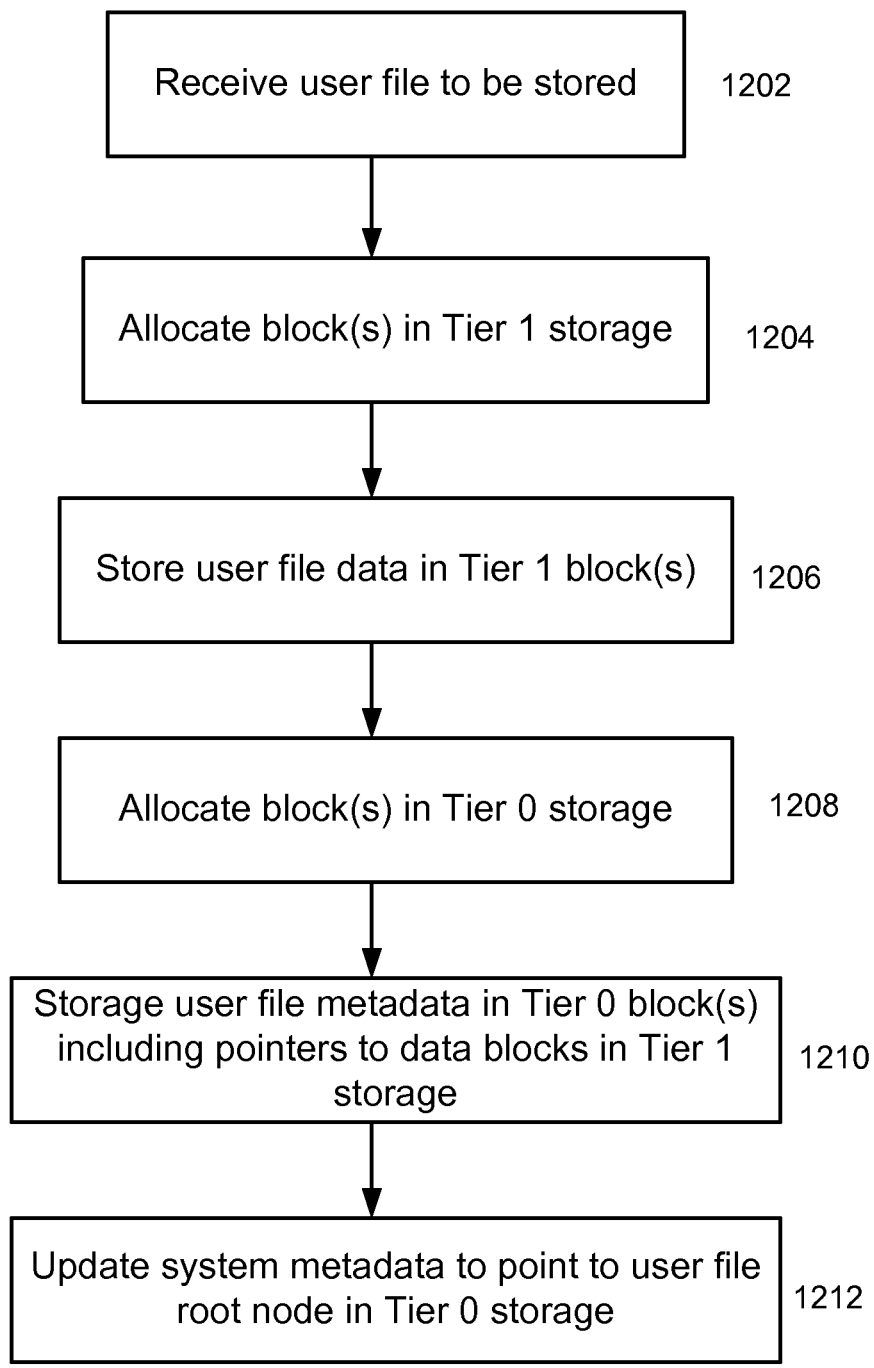
FIG. 12 is a logic flow diagram for storing a user file across two tiers, in accordance with an exemplary embodiment of the present invention.

FIG. 12 is a logic flow diagram for storing a user file across two tiers, in accordance with an exemplary embodiment of the present invention. Upon receiving a user file to be stored at step 1202, the file server allocates block(s) in Tier 1 storage, in step 1204, and stores user file data in the Tier 1 block(s), in step 1206. The file server also allocates block(s) in Tier 0 storage, in step 1208, and stores user file metadata in the Tier 0 block(s) including pointers to data blocks in Tier 1 storage, in step 1210. The file server updates system metadata to point to the user file root node in Tier 0 storage, in step 1212.

Figure 13:
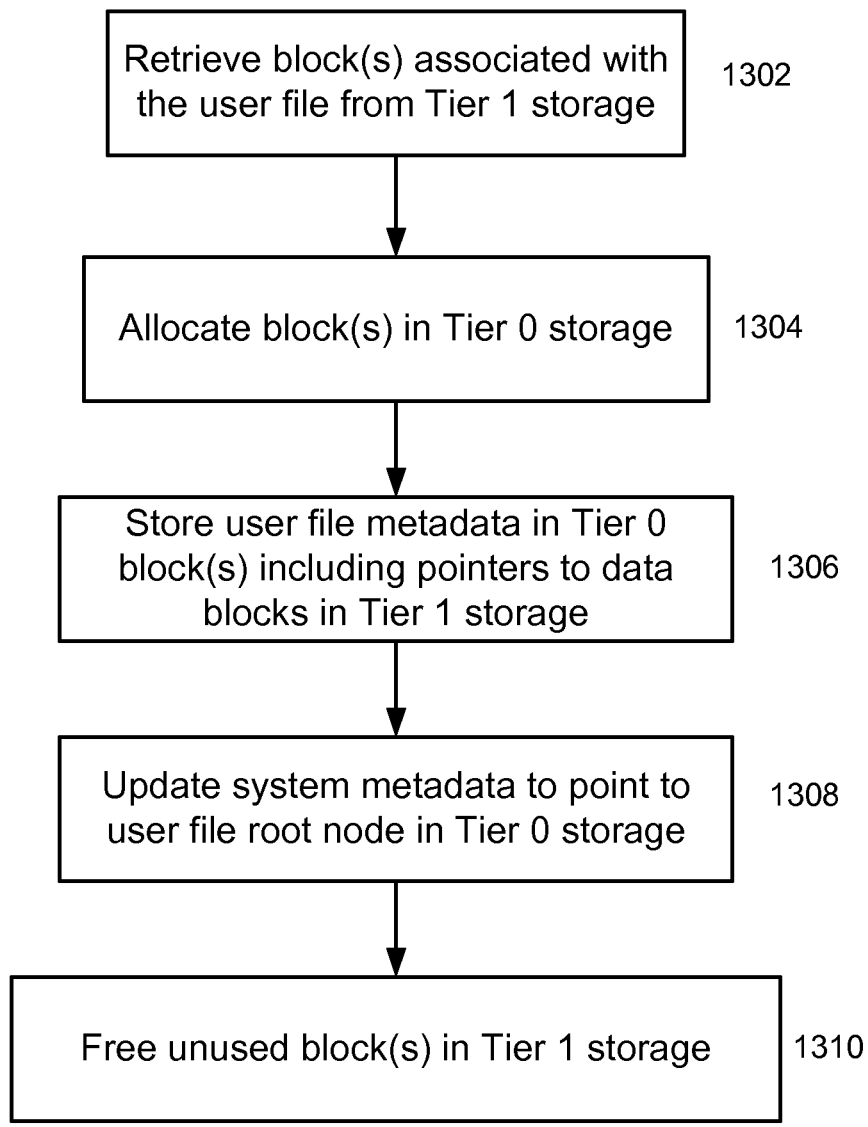
FIG. 13 is a logic flow diagram for converting a user file stored in Tier 1 storage to multi-tiered storage such as might be done after a single-tier filesystem is converted to a MTFS, in accordance with an exemplary embodiment of the present invention.

FIG. 13 is a logic flow diagram for converting a user file stored in Tier 1 storage to multi-tiered storage such as might be done after a single-tier filesystem is converted to a MTFS, in accordance with an exemplary embodiment of the present invention. In step 1302, the file server retrieves block(s) associated with the user file from Tier 1 storage. The file server allocates block(s) in Tier 0 storage, in step 1304, and stores user file metadata in the Tier 0 block(s) including pointers to data blocks in Tier 1 storage, in step 1306. The file server updates system metadata to point to the user file root node in Tier 0 storage, in step 1308. The file server later frees any unused block(s) in Tier 1 storage resulting from the conversion of the user file (e.g., as a background operation), in step 1310.

Figure 14:
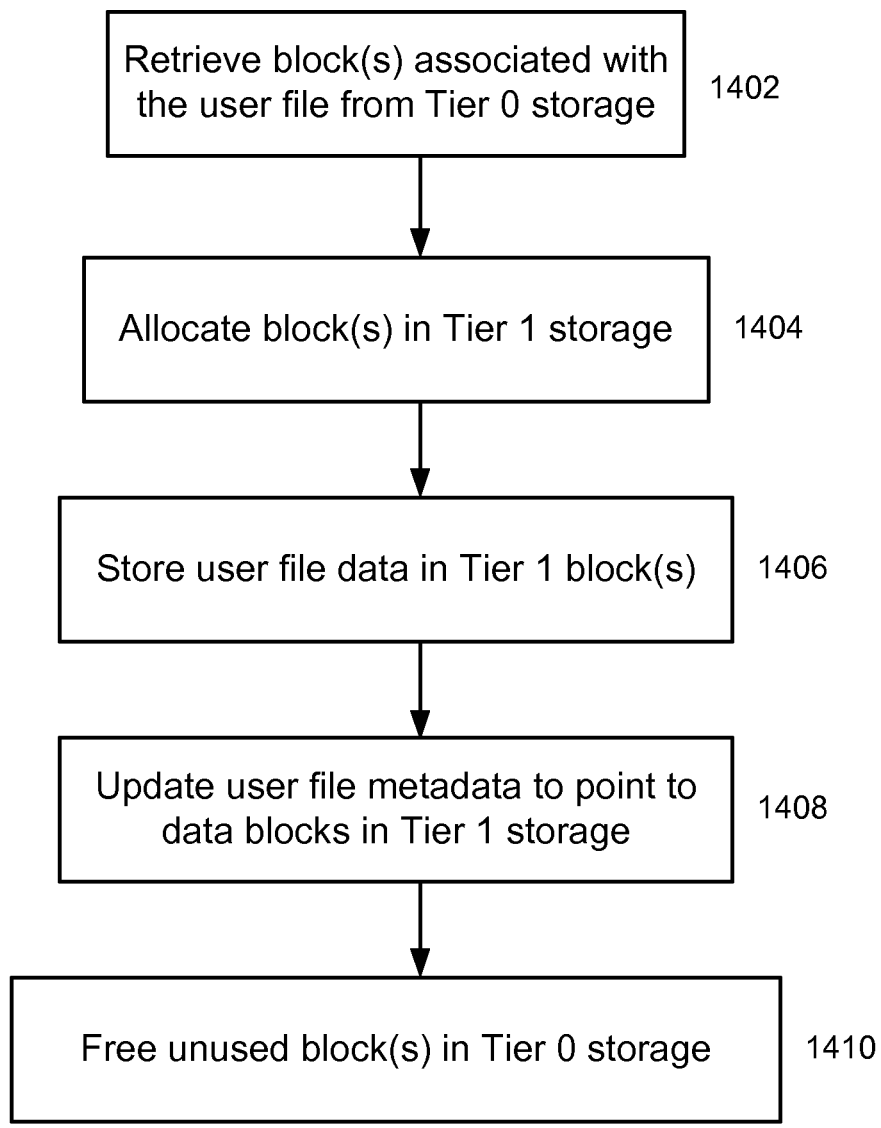
FIG. 14 is a logic flow diagram for splitting a user file stored in Tier 0 such as might be done when a small file stored in Tier 0 expands, in accordance with an exemplary embodiment of the present invention.

FIG. 14 is a logic flow diagram for splitting a user file stored in Tier 0 such as might be done when a small file stored in Tier 0 expands, in accordance with an exemplary embodiment of the present invention. In step 1402, the file servers retrieves block(s) associated with the user file from Tier 0 storage. The file server allocates block(s) in Tier 1 storage, in step 1404, and stores user file data in the Tier 1 block(s), in step 1406. The file server updates user file metadata to point to the data blocks in Tier 1 storage, in step 1408. The file server later frees any unused block(s) in Tier 0 storage resulting from the splitting of the user file (e.g., as a background operation), in step 1410.

Figure 15:
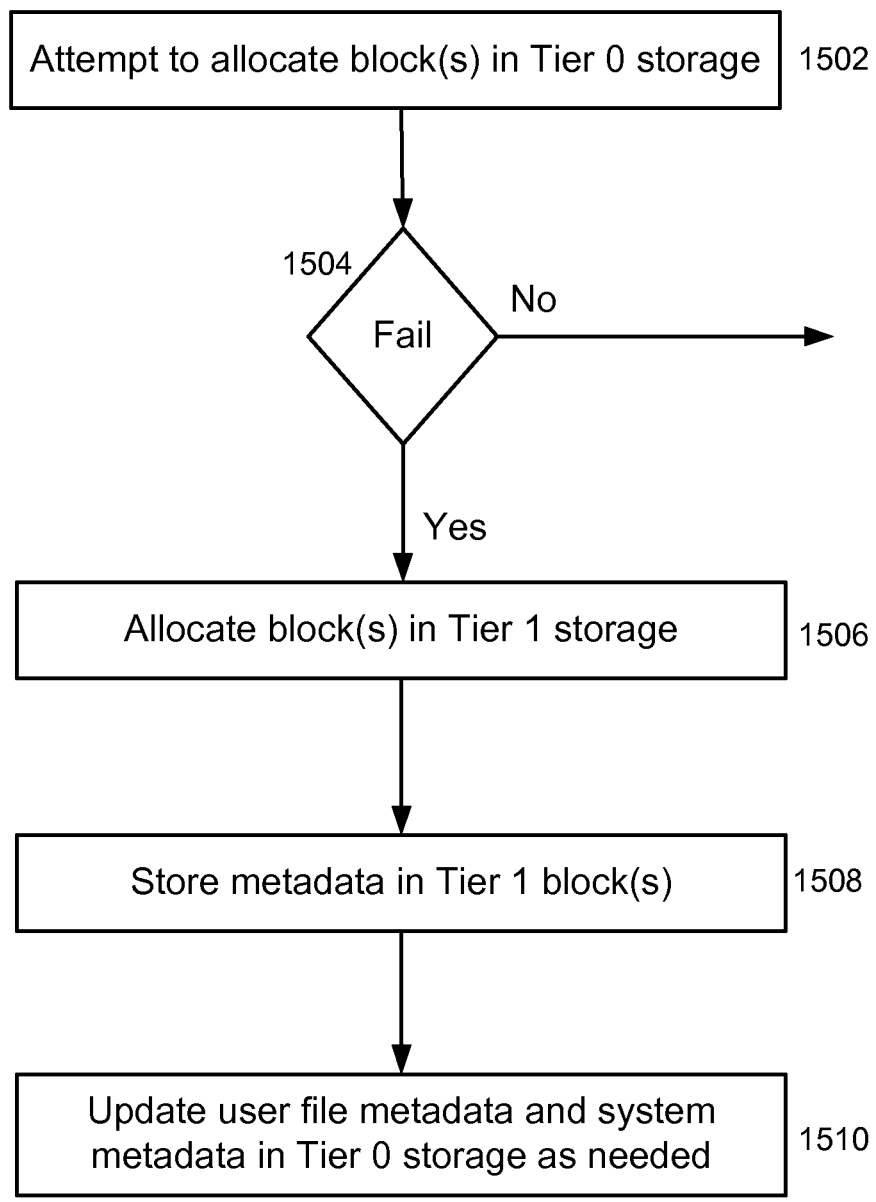
FIG. 15 is a logic flow diagram for spilling over to Tier 1 storage, in accordance with an exemplary embodiment of the present invention.

As discussed above, when there is not enough storage space in Tier 0, metadata may be "spilled over" into Tier 1 storage. FIG. 15 is a logic flow diagram for spilling over to Tier 1 storage, in accordance with an exemplary embodiment of the present invention. During the normal course of storing files, the file server may attempt to allocate block(s) in Tier 0 storage, in step 1502. If the operation files, in step 1504, and assuming that the file server is configured to spill over to Tier 1, then the file server allocates block(s) in Tier 1 storage, in step 1506, and stores metadata in the Tier 1 block(s), in step 1508. The file server updates user file metadata and system metadata in Tier 0 storage as needed, in step 1510.

The following are some additional details of specific embodiments that are based on BlueArc Titan and Mercury architectures.

User Interface Considerations

Among other things, the FSA will maintain statistics about how many blocks have spilt onto the wrong tier, how many are used in live space on each tier, and how many are in snapshots on each tier. The FSM will use these statistics to expand the filesystem by adding blocks on the appropriate tier. These blocks will be requested from Span Manager, which will allocate one or more complete chunks from one or more suitable stripesets.

In this exemplary embodiment, MTFS is optional, and it will remain possible for users to create spans and file systems without having to assign SDs to tiers. Span Manager will know whether each span (and thus each file system) is tiered, and will pass this information to the FSM, which will store it on disk.

It will be possible to retrofit tiers to an existing span. Span Manager will make all WFS-2 filesystems hosted on the span unavailable to the FSM (withdrawing permission for them to be mounted or used in any other way); it will then assign all the span's SDs to a tier specified by the user (typically, Tier 1), and will then make filesystems available again, passing a flag to say that the filesystems are now tiered. The next time each file system is mounted, the FSM will update its on-disk structures to reflect the tier in which each chunk resides. Since MTFS does not apply to WFS-1 filesystems in this embodiment, any WFS-1 filesystems hosted on the span will remain available during this operation.

In addition to allowing a user to confine an entire filesystem, preventing it from automatically expanding beyond a specified capacity, with MTFS, users will be able to specify a confining capacity per filesystem, per tier. These confining capacities will be stored in COD.

As mentioned above, the file server includes command line and graphical user interfaces through which the SDs are assigned to tiers. In exemplary embodiments, these interfaces also allow users to view and manage other aspects of the MTFS such as, for example, showing the number of free and used blocks in each tier both at span level (how much space is available for allocating to new or existing file systems) and at file system level (how much user data and metadata can be stored on the file system before it needs to expand), viewing the tier to which an SD has been assigned, viewing a list of SDs in a specified tier (or in no tier at all), and exporting tiers to text files on one cluster and importing them from text on another cluster in order to facilitate storage migration between clusters.

Management of SD Tier Numbers

The subsystem responsible for managing identifiers (referred to as the "ID Manager") associates each system drive (SD) with a tier number that represents the type of storage that hosts the SD, e.g., Flash, FibreChannel, SATA, and so on. Tier numbers are stored in a record file (RecordFile) with the rest of the ID Manager database (e.g., using one or two extra bytes per SD). Among other things, this allows tier numbers to be visible even when a span is not loaded, and the tier numbers will be preserved when a span is torn down and recreated but generally will need to be migrated when a span and its file systems move between clusters. Also, the effect on registry sizes should be minimal, since one or two extra bytes stored per SD with typically a few hundred SDs per cluster represents a nominal amount of added storage requirements.

The server needs to know whether or not an SD has been assigned to a tier. In this exemplary embodiment, SDs will default to being in no tier at all, although in alternative embodiments, SDs may default to a particular tier (e.g., Tier 1) and have to be reconfigured if they belong in another tier. Internally, "no tier" will be represented by a predetermined value, such as a value of 255 (0xFF). Only Span Manager and ID Manager will see the "no tier" value; a single-tiered file system will be treated as if it were in Tier 0. Console commands that assign SDs to tiers, if passed a "remove tier" tier number such as a value of negative one (−1), will remove SDs from their tiers. Allowing an SD to be in no tier adds some complication to the file server implementation but has a number of advantages from users' perspectives, e.g., it prevents users from exposure to MTFS unless they explicitly ask for it, and it avoids the risk of inadvertently creating a Tier 0 or Tier 1 span.

In order to prevent SDs associated with a particular stripeset to be assigned to different tiers, the file server enforces the restriction that all SDs in the same SD group must be assigned to the same tier. Thus, in this exemplary embodiment, the user can specify a tier number at the same time as creating an SD group, and the tier number will be associated with all SDs of the SD group.

Unlike SD groups, it will not be mandatory to set up tier numbers before creating a span, and the file server will not warn (by, for example, logging events or issuing trouble warnings) if tiers have not been set up. MTFS is an optional feature.

Creating or expanding a span involves creating a stripeset. Span Manager will enforce the constraint that all the SDs in a stripeset have the same tier number. It will essentially impose three restrictions:

(1) no stripeset can be created from SDs in two or more tiers or from a mixture of tiered and untiered SDs;

(2) a user cannot change the tier number of an SD without reassigning the rest of the SDs in the stripeset to the same tier, and even then, all the chunks in the stripeset must be unused; and (3) an SD that is not in a tier cannot be added to a span whose SDs are in tiers, and an SD that is in a tier cannot be added to a span whose SDs are not in tiers.

In this exemplary embodiment, the user can specify a tier number at the time of creating a stripeset, and the tier number will be associated with all SDs associated with the stripeset.

In this exemplary embodiment, the file server will not allow a change to the tier number of the SDs in a stripeset if any of that stripeset's chunks are used. In essence, then, once a stripeset is assigned to a particular tier and the stripeset is used, the stripeset must remain in that tier. Alternative embodiments may allow the tier of a used stripeset to be changed, in which case data stored in the stripeset could be migrated to other storage of the same (pre-change) tier.

However, the file server will allow a user to retrofit MTFS to an existing span and its filesystems. In this exemplary embodiment, a command will be provided that sets the tier of all the SDs in a single-tiered span and updates all its filesystem structures appropriately. Filesystems will have to be unmounted before this operation can be carried out. Thus, for example, the user may assign the existing storage in the span to Tier 1 and then add Tier 0 storage or vice versa.

In this exemplary embodiment, a span is considered to be multi-tiered if its SDs have been assigned to tiers, even if they are all in the same tier. Otherwise, it is untiered. A span can change from untiered to tiered any time provided that its filesystems are not mounted or otherwise in use, and a span can change from tiered to untiered as long as it contains only one tier. If a span and at least one of its filesystems have been expanded to a second tier, the span can never be downgraded to an untiered state. Whether a span is tiered or untiered determines the way some management functions work.

Free Space, Expansion, and Confinement

Free space essentially occurs in two places. Generally speaking, some of a span's chunks will be used, while others are unused; the unused chunks make up the free space on the span. Meanwhile, within the chunks allocated to a filesystem, some blocks will be used and others not; unused blocks make up the free space on the file system. It is possible for a span with plenty of free space (unused chunks) to hold filesystems that are nearly full (having very few unused blocks); conversely, a span can be completely full (so that no filesystems can be created or expanded), but its existing file systems may have plenty of free space, so that files can be created and expanded.

In a representative embodiment, the concept of "free space" is used in various contexts. For example, certain user-interface commands and screens display free space information, and certain operations and their corresponding user-interface commands and screens provide for expanding storage space or constraining storage space.

Generally speaking, the user interface and other subsystems that utilize space information will be adapted to support space information on a per-tier basis when the span and/or filesystem is configured for multi-tiered operation. For example, commands and SMU screens that show free space will be adapted to report space for each tier.

For expansion and confinement on multi-tiered spans, the user will be required to specify a capacity and/or confinement limit for each tier. When a span is created, the user can specify an initial capacity and/or confinement limit. In a representative embodiment, on a multi-tiered span, the file server will pre-allocate only a small amount of metadata space and will draw the rest of the initial size from the user-data tier (if no initial size is specified, a nominal amount of space will be drawn from each tier). Any confinement limit specified by the user when the span is created will apply only to the user-data tier; the metadata tier will not initially be confined (in other words, it can autoexpand freely). This is mainly because users cannot reasonably be expected to judge how much metadata they will need for a given filesystem but may well have a good idea of how much user data they need to store. In this representative embodiment, users who wish to do so can separately confine the metadata tier before they first mount the filesystem.

Additionally or alternatively, the file server may be adapted to allow the user to specify a file system type (e.g., lots of small files; few large files; database) and the server can automatically pre-allocate an appropriate amount of metadata space (e.g., more metadata space needed for lots of small files than for few large files) and then confine both tiers.

When a tiered span is expanded, the user is required to specify the tier numbers of the new SDs if they had not already been specified.

When a tiered filesystem is expanded, the user will specify a tier number as well as the amount of space to be added. In a representative embodiment, the file server does not "spill over" to another tier, i.e., if Span Manager cannot satisfy the expansion request using chunks from the appropriate tier, it does not use chunks from other tiers. Users who are prepared to allocate space from the "wrong" tier can issue a second command to do so.

When a tiered filesystem is confined, the user will be required to specify a tier number as well as a confining capacity. A default may be to confine the filesystem to its current capacity on all tiers.

Span-confinement will remain unchanged: autoexpansion is impossible on all tiers of a confined span. This decision arises from the recommended use of span-confine to prevent all autoexpansion during maintenance.

Storing multiple confinement limits will require a new filesystem COD schema. Nevertheless, Span Manager will (as usual) preserve backwards-compatibility whenever the new feature is not used, and the previous release's COD converter will be updated to provide a last-resort downgrade path.

Allocating Blocks in the Right Tier

The FSA is responsible for allocating blocks of free space for the filesystem. It also implements the filesystem side of DWB, allocating blocks from the correct SD group to keep writes flowing to all SD groups in parallel.

The FSA is informed about SD groups through a record provided for each group. A previously unused field in the record (specifically a Class field) will be used to indicate which tier an SD group is located on. FSA will use the existing DWB functionality to control which SD group and thus which tier a block is allocated on.

Extra cursors will be provided within FSA to allow separate cursors for user data and metadata. When a block is requested, FSA will examine a block type field and select the appropriate cursor. The DWB mechanism will ensure that these cursors are kept in an area of the filesystem that maps on to the appropriate tier. If at any time an allocation cannot be made in the appropriate tier, the filesystem can optionally be failed or (by default) placed into a "degraded MTFS" allocation state in which further allocations will not abide by the MTFS allocation rules and may be allocated from any SD group and thus any tier. When the next filesystem expansion occurs, the filesystem will revert to a "normal MTFS" allocation state, in the hope that extra chunks from the "full" tier have been added.

Spillage and Rectification

When a block or chunk has to be allocated from the wrong tier, it may be said to have "spilt" on to the wrong tier.

Allocating blocks or chunks from the wrong tier is referred to herein as "spillage." Moving spilt data to the correct tier is referred to herein as rectification.

It is possible to find data that has spilt on to the wrong tier and move it. For example, metadata that has spilt on to the user data tier may be moved back to the metadata tier, and user data that has spilt on to the metadata tier may be moved back to the user data tier. Data may be moved by "dirtying" it (i.e., marking it as having been modified), which will cause it to be written to new space. Provided that enough space is available, moving the data will cause it to end up on the correct tier. When data is moved, system metadata and user metadata is updated as needed, e.g., the system metadata typically would be updated when the root node of a user file object is moved from the user data tier to the metadata tier.

It should be noted that such a rectification mechanism may be considered optional and may be omitted from certain implementations. In implementations that lack such a rectification mechanism, the user should ensure that space is always available on both tiers.

Keeping Track of Tier Usage

The FSA will maintain two counters per tier, one to record how many blocks have been allocated in the tier, and the other counter to record how many of these allocations are now only required for snapshots. These counters are in addition to two in-use/in-snapshot counters that are recorded against the entire filesystem.

When a checkpoint is taken, FSA will send these counters to an object store module, which writes the information to the current checkpoint's DSB.

The checkfs and fixfs commands will be modified to be aware of MTFS so they can check/maintain these counts. Span Manager will provide an efficient interface (hosted on the FSM) that checkfs and fixfs will use to find the tier of a block, given its file system offset.

Communication Between the Filesystem and Storage Logic

When setting up DWB at mount time, the FSA is provided with a structure that describes SD groups. It obtains this information from ID Manager, which will gain a new method to report the tier number of a system drive.

When the filesystem is autoexpanded, the Span Manager is informed of the tier number from which the new space should be drawn.

If Span Manager cannot satisfy the request, it will fail the expansion. In this case, expansion may be optionally retried from another tier.

When the FSA allocates a block, it will do so on a best-effort basis. If it cannot allocate space from the correct tier (i.e., Tier 0 for metadata, Tier 1 for user data), it will either spill over to the wrong tier or fail the file system based on the configuration setting. In a representative embodiment, the default will be to spill over, rather than to fail the filesystem. The configuration setting will be stored in the DSB and provided as a parameter to FSA when FSA is opened.

A checkpoint response will be extended to include the per-tier counts from the FSA. At present, the auto-expander uses the total in-use block count in the checkpoint response to determine whether the filesystem should be asynchronously expanded. With MTFS, the usage of each tier will be checked over time to see if it is becoming full according to a predetermined criterion, with per-tier asynchronous expands being scheduled as appropriate.

When a filesystem operation requires more space than is available, we will need to separate how many blocks are required from each tier and expand them appropriately. If we tolerate spillage, it may be simpler to only expand Tier 1 (the user-data tier).

At present, when an autoexpansion request cannot be satisfied, Span Manager sends the Filesystem a notification that new space is unlikely to become available in the near future. This notification prevents the FS from continually requesting more space. Should new space become available (because, for example, the user increases the filesystem's confinement limit or expands the span), Span Manager sends the Filesystem a notification that future expansion requests would probably succeed. With MTFS, the Filesystem will store this status for each tier of a file system, rather than for the file system as a whole.

Statistics

FSA will provide three new statistics, and three new information fields within the fsa_create_checkpoint and fsa_volume_status responses:

1) The number of blocks-allocations that had to spill from each tier to another tier
2) The number of used blocks on each tier
3) The number of snapshot blocks on each tier Existing statistics will show how many I/Os are executing on each SD, and thus on each tier.

Diagnostics

Diagnostics can be split into three groups, namely storage diagnostics, filesystem diagnostics, and diagnostics for communication between Span Manager and the filesystem.

Storage Diagnostics

Rather than adding new commands for diagnosing MTFS, in this exemplary embodiment, a number of existing commonly used commands will be extended for MTFS.

The span-list command will modified to report free and used space on each tier.

The span-list, sd-group-list, and sd-list commands will be modified to report SD tier numbers, as will the lower-level sd-object-dump and span-object-dump commands.

The sd-dump-cod, cod-backup-dump, and span-dump-cod commands will be modified to dump the new Cod, as will the Cod converter.

The trouble span command will be made to report when free space is running low or when a filesystem is approaching its autoexpansion limit on any tier, and not just overall. Events will be logged in similar circumstances.

Certain commands will be modified to deal with situations in which tier numbers are inconsistent. For example, suppose that, on Cluster C, SDs 0 and 1 are marked as being in the same tier (or no tier at all). A user creates a simple span that uses both these SDs in the same stripeset:

span-create Foo 0 1

Now the span is assigned to Cluster D, in which the two SDs are marked as being in different tiers. (This is possible because SD tier numbers are stored in each cluster's registry and may have been incorrectly set up on one cluster or the other.)

In this situation, Cluster D will refuse to make the span's filesystems available for mounting. span-list and trouble span will print warnings about inconsistent tier numbers. The resolution is to unload the span with span-deny-access, configure the tier numbers correctly, license one SD with sd-allow-access, and then license the rest of the SDs with span-allow-access (which will cause the span to be loaded into memory).

The span-ignore-corruption command will not bypass the check for consistent tier numbers. Its job is to help recover from damaged storage, rather than incorrect configuration. The span-accept-corruption command will not attempt to fix inconsistent tier numbers because it does not have enough information to do so (it could simply move all SDs to Tier 0, but that would cause spillage unless and until the user sets up tier numbers correctly).

This situation should be rare and should not occur when users use the SMU to migrate spans between clusters because the SMU will copy SD tier numbers from the old cluster to the new one.

Filesystem Diagnostics

The df command will be modified to report the amount of free space on each tier, rather than just for the file system as a whole. The FSA will pass per-tier block counts to the filesystem software, which will store them in DSBs; this permanent storage will allow free space to be reported even when file systems are not mounted.

A trouble perf reporter will warn when a large number of blocks-allocations that have recently spilt on to the wrong tier. However, there will be no perf reporter for the total number of structures residing on the wrong tier: the filesystem will not track the necessary information.

Diagnostics for Communication Between Span Manager and the FS

Span Manager already prints output to a dblog when an expansion request is made. This output will be made to include tier numbers.

Managing System Drive Tier Numbers

Tier numbers are yet another aspect of configuration that has to be considered when a user is setting up storage. To minimize inconvenience to the user, a representative embodiment allows tier numbers to be considered as a property of an SD, an SD group or a stripe set. When retrofitting MTFS to an existing single-tiered span, the user will even be allowed to configure a tier number for a complete span. Also, users will be permitted to set up tier numbers at several stages during the setup process. As a result, a representative embodiment will provide several largely-equivalent ways of setting SD tier numbers, although only one method will need to be used, and so users can pick whichever is most convenient for them. The following is a description of some of the commands for the user for configuring tier numbers based on the following restrictions:

1) All SDs in the same SD group or stripeset must be in the same tier (or in no tier).
2) The tier number of every SD in a stripeset can be changed only if the stripeset's chunks are all unused.
3) The tier number of every SD in a single-tiered span can be changed, even if it has filesystems, but one cannot do the same to a multi-tiered span.
4) An SD that is not in a tier cannot be added to a span whose SDs are in tiers.

sd-set

The sd-set command, which is used to configure several characteristics of one or more system drives, will be modified to include a new -tier switch that sets SD tier numbers. For example, sd-set -tier 1 0-7 will place SDs 0-7 into tier 1.

If any of SDs 0-7 is in an SD group or a stripe set with any SD other than SDs 0-7, this example command will fail, because all SDs in an SD group or a stripe set must be in the same tier. The sd-set command will include two additional switches: -add-group will include all SDs in the same SD groups as the SDs specified, and -add-stripeset will include all SDs in the same stripe sets as the SDs specified. To prevent changes rippling out uncontrollably, combining the two switches will not recursively gather up all SDs in the affected groups, then all SDs in stripesets using those groups, then all SDs in the same groups as any SDs in those stripesets, and so on. Users who want that effect can achieve it by specifying multiple SDs at the command line.

The following are some examples based on the following sample configuration:

SD group: SDs 0, 1, 2
SD group: SDs 3, 4, 5
SD group: SD 6
SD group: SD 7
SD group: SD 8
Ungrouped SDs: 9, 10
Span Accounts: one stripeset: SDs 4, 5, 6
Span Engineering: one stripeset: SDs 7, 8

To place SD 9 into Tier 1, a user can run the following command:

sd-set -tier 1 9

To place SDs 0-2 into Tier 1, a user can run either of these commands (or variants upon them):

sd-set -tier 1 0-2
sd-set -tier 1 -add-group 0

To place SDs 7 and 8 into Tier 1, a user can run either of these commands (or variants upon them):

sd-set -tier 1 7,8
sd-set -tier 1 -add-stripeset 7

To place SDs 3-6 into Tier 1, a user can run any of these commands (or variants):

sd-set -tier 1 3-6
sd-set -tier 1 -add-stripeset 3,4
sd-set -tier 1 -add-group 4-6
sd-set -tier 1 -add-group -add-stripeset 4 sd-group-create

The sd-group-create command will gain a new -tier switch, which will set the tier numbers of all the specified SDs before creating the new group. For example:

sd-group-create -tier 1 7-9 will place SDs 7-9 into a new SD group and assigns all of them to Tier 1.

If the new -tier switch is not provided, then the command leaves the SDs in their existing tiers. They must all be in the same tier, or the command will fail.

sd-group-add

The sd-group-add command will gain a new -set-tier switch (which will not take an argument) to place the new SDs into the same tier as the SDs already in the group. If this turns out to be impossible, the command will fail. For example, given the sample groups and stripesets listed above, sd-group-add -set-tier 3 8 places SD 8 into the same tier as SDs 3-5 and adds it to the same SD group.

If -set-tier is not provided and the new SD is not already in the same tier as the SDs in the group, sd-group-add will fail.

sd-group-alone

The sd-group-alone command will gain a new -tier switch, which will assign the specified SDs to a new tier at the same time as creating groups for them. For example, sd-group-alone -tier 1 9,10 will assign the two SDs to Tier 1 and then create a new SD group for each SD.

If -tier is not specified, sd-group-alone leaves the SDs in their existing tiers.

span-create

The existing span-create command creates a span that contains exactly one stripeset. It will gain a new -tier switch, which specifies the tier number of the SDs in the new span. For example, span-create -tier 1 Accounts 0-9 assigns SDs 0-9 to Tier 1 and then builds them into a new span called Accounts.

If -tier is not specified, the command leaves the SDs in their existing tiers. They must all be in the same tier, or the command will fail.

span-expand

The existing span-expand command combines a number of SDs into a stripeset and adds it to an existing span. It will gain a new -tier switch, which specifies the tier number of the SDs being added. For example, span-expand -tier 0 Accounts 10-19 assigns SDs 10-19 to Tier 0 and adds them to span Accounts.

If -tier is not specified, the command leaves the SDs in their existing tiers. The command will fail if the new SDs are not all in the same tier, or if they are not in any tier and the span's existing SDs are in a tier.

span-tier

A new span-tier command will set the tier number of an untiered or single-tiered span. For example, span-tier Engineering 0 moves all the SDs in span Engineering into Tier 0. If the span is multi-tiered, the command will fail.

sd-list

The existing sd-list -scsi command will be modified to show tier numbers.

sd-list and sd-spec will gain a way of selecting SDs in a particular tier. For example, sd-list -in-tier 1 will list all SDs in Tier 1, and sd-allow-access all:denied:in-tier=1 will license (allow access to) all unlicensed SDs in Tier 1.

sd-tier-export

A new sd-tier-export command will export SDs' tier numbers to a text file. For example, sd-tier-export tiers.txt Accounts will export the tiers of all SDs in span Accounts to a text file called tiers.txt. SDs that are not in tiers will not be exported.

The aim of this command and sd-tier-import (described below) is to move tier information between clusters, rather than to back up tier numbers for later use. In practice, most customers who migrate spans between servers will use the SMU, and so these commands will function largely as a customer-visible test harness for the API calls that ID Manager will provide and which the SMU will use to export and import tier numbers.

Although this example command specifies a span label, sd-tier-export will use sd-spec, so that SDs can be specified with complete flexibility. If no SDs are specified, all SDs that are in tiers will be exported.

So that the exported file can be read by a different cluster (where SDs' device IDs are different), it will specify Luids instead of device IDs. (A given SD's device ID usually varies between clusters, but its Luid is the same everywhere.) Because the initial MTFS implementation will use a simple, fixed scheme for numbering tiers, it is guaranteed that tier numbers will be compatible between clusters.

sd-tier-import

A new sd-tier-import command will read a file created by sd-tier-export and, where SDs exist on the local cluster, change their tier numbers to match those on the cluster that created the file. The usual restrictions on tier numbers will apply; so, if, for example, SDs are grouped differently on the two clusters, or if the target cluster knows about a span that the source target does not, the import may fail, even if the file is well-formed. In that case, the system will ensure that the import does nothing at all: it will not import some tier numbers and fail to import others. It will also produce a human-readable error message to explain the problem; the SMU (after HTML-escaping) will be able to display this message verbatim.

Managing Space filesystem-create

The filesystem-create command allocates some space from a span and creates a new filesystem on it. Its new behavior is described above. In short, if the user specifies an initial size, most of the new space will be taken from the user-data tier; if the user specifies a confinement limit, it will apply to the user-data tier, and the metadata tier will remain unconfined unless and until the user issues a separate filesystem-confine command.

filesystem-confine

On a tiered filesystem, filesystem-confine must be used with a new -tier switch. For example, filesystem-confine -tier 0 ProjectX 200 filesystem-confine -tier 1 ProjectX 5000 will prevent autoexpansion beyond 200 GB in Tier 0 and 5000 GB in Tier 1.

On an untiered filesystem, the new switch is unnecessary. If it is provided, the specified tier number must match the tier number of all the SDs in the span.

span-confine

The action of span-confine is explicitly unchanged. It does not gain a new -tier switch, since confining a span will prevent all autoexpansion on all tiers in this exemplary embodiment.

filesystem-expand

On a tiered filesystem, filesystem-expand must be used with a new -tier switch. For example, filesystem-expand -tier 0—by 100 ProjectX adds 100 GB of space from Tier 0 to filesystem ProjectX.

If Tier 0 does not have enough space, the command fails; it does not spill over to other tiers. Users who want to do that can always issue a second filesystem-expand command, specifying a different tier.

span-list

When displaying a multi-tiered span, span-list will display the amount of free space in each tier.

df

When displaying a filesystem on a multi-tiered span, df will display the amount of free and used space on each tier, rather than overall percentages.

SMU Support for MTFS

The System Management Unit (SMU) will be modified to support tiered storage. Specifically, various SMU screens will be modified to allow for display of tier information and limited configuration of tiered storage, and the SMU will perform some ancillary functions relating to tiered storage. For example, when the user adds heterogeneous storage to a tiered span (e.g., SSD storage added to existing disk storage, or SATA disks added to existing FibreChannel disk storage), the SMU will offer to create a second tier if the span was single-tiered or will prompt the user to identify the tier to be expanded if the span was multi-tiered.

Clustering Support for MTFS

Frequently, two or more file servers work together in a cluster. Filesystems can migrate between the servers in a cluster, and, in most respects, all of the servers are expected to hold and honor the same configuration. When an SD's tier is changed (or set for the first time), the server making the change will store the information in the cluster's registry and will send a broadcast to ensure that all other servers in the same cluster are informed. In this way, changes will take place instantly throughout the cluster; and, if any of the affected file systems should migrate to another server at any point, information about tiers will remain consistent.

With each file server, MTFS will work by adding to existing mechanisms. For example, ID Manager already has logic to propagate details of SDs around the cluster. An extension of this logic will ensure that all nodes agree about SDs' (and thus SD groups' and stripe sets') tier numbers. Span Manager already has logic to propagate newly created and loaded filesystems around the cluster, and also to tell other nodes when confinement limits are changed. This logic will be extended so that it can propagate multi-tier confinement limits. Management calls such as those that expand or confine a filesystem already work across the cluster; they will gain knowledge of tier numbers, but their clustering and locking semantics generally will not change.

Dynamic Read Balancing (DRB)

Dynamic Read Balancing (DRB) is a complementary feature to DWB that first reads and then rewrites data using DWB as a background process. When the DRB utility is started, it begins rewriting files and stops once the data is balanced across all spindles. This process can take some time to complete if the amount of data to be restriped is considerable, but eventually the DRB process will restripe and redistribute all data across all spindles in an automated fashion. Any hosts writing new data during the DRB process contribute to the balancing scheme.

DRB essentially works by splitting a filesystem's chunks into two sets, an over-utilized set and an under-utilized set. It then prevents the FSA from allocating blocks in chunks on "over-utilized" SD groups, and starts rewriting live user data blocks. The rewriting causes user data to be moved from its original location to a new location (on one of the under-utilized SD groups).

On a MTFS, DRB operations could cause spillage (in either direction) or a file system failure. In order to avoid having the DRB move metadata, a representative embodiment that supports DRB on a MTFS may restrict DRB to user data tier(s).

CONCLUSION

While the embodiments described above manage tiers of storage at the stripeset level, it should be noted that tiers of storage may be managed at other levels (e.g., at the SD or range level) with appropriate changes in the way tiers are mapped to the filesystem space.

While an exemplary embodiment having two storage tiers was described above, it should be noted that alternative embodiments may have three or more tiers.

For example, an embodiment may have three tiers including a high-speed storage tier comprised of solid state storage devices, a medium-speed storage tier comprised of high-speed disk storage devices, and a lower-speed storage tier comprised of low-speed disk storage devices. In such an embodiment, user data may be split between the bottom two tiers based on a predetermined policy (e.g., based on file type, file access frequency, file size, or other storage policy), which may be configurable. User metadata for middle-tier files (i.e., files for which the user data is stored in the middle tier) typically would be stored in the top tier as discussed above. User metadata for bottom-tier files (i.e., files for which the user data is stored in the bottom tier) may be stored, for example, in the top tier as in the embodiments described above, in the middle tier in order to offload the storage from the top tier but still gain some advantage in file access, or along with the user data in the bottom tier; such storage may be based on a predetermined policy, which may be configurable. Furthermore, user data may be migrated between the lower storage tiers based on a predetermined migration policy (e.g., an infrequently accessed middle-tier file may be moved to the bottom tier for archiving, a bottom tier file may be moved to the middle tier when it is accessed), which may be configurable.

Thus, the storage tiers may be considered as a hierarchy, with system metadata primarily stored in the top tier and with user files typically split between two tiers with the user metadata for a user file stored in a hierarchically higher tier than the corresponding user data, but also allowing a complete user file (i.e., both the user metadata and user data) stored in a single tier.

It should be noted that the term "server" is used herein to describe a device that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. In a storage system having a plurality of storage devices, wherein different storage devices may be associated with different storage characteristics, a multi-tiered filesystem method comprising:
   aggregating storage from the plurality of storage devices into a storage pool having a plurality of storage tiers, the storage tiers having different storage characteristics;
   allocating storage from a plurality of the storage tiers for a multi-tiered filesystem;
   aggregating the allocated storage into a contiguous filesystem storage space such that at least two regions of the contiguous filesystem storage space are associated with different storage tiers; and
   for storing a particular quantum of data:
      selecting a storage tier for the quantum of data;
      allocating, from the contiguous filesystem storage space, at least one block of storage from at least one region associated with the selected storage tier; and
      storing the quantum of data in the at least one allocated storage block, wherein the storage system is operable to store user data associated with a user file into at least one storage device forming a lower storage tier in the storage pool and to store user metadata for managing the user file into at least one storage device forming a higher storage tier in the storage pool based on the types of the storage devices and the type of the user data and the user metadata; the user metadata stored in the higher storage tier separately from the user data stored in the lower storage tier.

2. A method according to claim 1, wherein the storage tiers are based on at least one of different storage device media, different storage device speeds, or different storage device reliabilities.

3. A method according to claim 2, wherein the different storage device media include solid state storage and at least one type of disk storage.

4. A method according to claim 1, wherein the storage tiers include a high-speed storage tier and at least one lower-speed storage tier.

5. A method according to claim 1, wherein the storage tiers include a high-reliability storage tier and at least one lower-reliability storage tier.

6. A method according to claim 1, wherein the at least two regions of the contiguous filesystem storage space include at least one metadata region predominantly used for storing metadata and at least one user data region predominantly used for storing user data.

7. A method according to claim 6, wherein the at least one metadata region is associated with solid state storage devices and wherein the at least one user data region is associated with disk storage devices.

8. A method according to claim 6, wherein the at least one metadata region is associated with high-reliability disk storage devices and wherein the at least one user data region is associated with lower-reliability disk storage devices.

9. A method according to claim 6, further comprising:
storing system metadata associated with the multi-tiered filesystem in blocks of storage associated with the at least one metadata region; and
for each of a first number of user files having user metadata and user data, storing the user metadata for the user file in blocks of storage associated with the at least one metadata region and storing the user data for the user file in blocks of storage associated with the at least one user data region.

10. A method according to claim 9, further comprising:
selectively storing a portion of system metadata in blocks of data associated with the at least one user data region when there is insufficient storage space in the at least one metadata region for storing the portion of system metadata.

11. A method according to claim 9, further comprising, for each of a second number of user files, storing both the user metadata and the user data for the user file in storage blocks associated with the at least one metadata region.

12. A method according to claim 9, wherein the at least one user data region includes a plurality of user data regions associated with different user data tiers, and wherein storing the user data for the user file comprises:
selecting a user data tier for the user data from among the plurality of user data tiers based on a predetermined storage policy; and
storing the user data for the user file in blocks of storage associated with the selected user data tier.

13. A method according to claim 12, further comprising, for each of a third number of user files, storing the user metadata and the user data for the user file in blocks of storage associated with different user data tiers, wherein the user data tier in which the user metadata is stored is associated with a hierarchically higher storage tier than the user data tier in which the user data is stored.

14. A method according to claim 12, further comprising, for each of a fourth number of user files, storing the user metadata and the user data for the user file in blocks of storage associated with the same user data tier.

15. A method according to claim 1, further comprising:
migrating data between storage tiers based on a predetermined migration policy.

16. A method according to claim 1, wherein the multi-tiered filesystem is managed using a hierarchy of virtual storage constructs including system drives, ranges composed of one or more system drives, stripesets composed of one or more ranges, and spans composed of one or more stripesets, and wherein the storage tiers are managed at the stripeset level such that each stripeset is associated with a storage tier and the multi-tiered filesystem integrates storage from stripesets associated with multiple storage tiers.

17. A file storage system comprising:
a plurality of storage devices including storage devices associated with different storage characteristics; and
a file server operably coupled to the plurality of storage devices, the file server configured to aggregate storage from the plurality of storage devices into a storage pool having a plurality of storage tiers, the storage tiers having different storage characteristics; allocate storage from a plurality of the storage tiers for a multi-tiered filesystem; aggregate the allocated storage into a contiguous filesystem storage space such that at least two regions of the contiguous filesystem storage space are associated with different storage tiers; and for storing a particular quantum of data:
select a storage tier for the quantum of data;
allocate, from the contiguous filesystem storage space, at least one storage block of storage from at least one region associated with the selected storage tier; and
store the quantum of data in the at least one allocated storage block, wherein the file server is operable to store user data associated with a user file into at least one storage device forming a lower storage tier in the storage pool and to store user metadata for managing the user file into at least one storage device forming a higher storage tier in the storage pool based on the types of the storage devices and the type of the user data and the user metadata the user metadata stored in the higher storage tier separately from the user data stored in the lower storage tier.

18. A system according to claim 17, wherein the storage tiers are based on at least one of different storage device media, different storage device speeds, or different storage device reliabilities.

19. A system according to claim 18, wherein the different storage device media include solid state storage and at least one type of disk storage.

20. A system according to claim 17, wherein the storage tiers include a high-speed storage tier and at least one lower-speed storage tier.

21. A system according to claim 17, wherein the storage tiers include a high-reliability storage tier and at least one lower-reliability storage tier.

22. A system according to claim 17, wherein the at least two regions of the contiguous filesystem storage space include at least one metadata region predominantly used for storing metadata and at least one user data region predominantly used for storing user data.

23. A system according to claim 22, wherein the at least one metadata region is associated with solid state storage devices and wherein the at least one user data region is associated with disk storage devices.

24. A system according to claim 22, wherein the at least one metadata region is associated with high-reliability disk storage devices and wherein the at least one user data region is associated with lower-reliability disk storage devices.

25. A system according to claim 22, wherein the file server is further configured to store system metadata associated with the multi-tiered filesystem in blocks of storage associated with the at least one metadata region; and for each of a first number of user files having user metadata and user data, store the user metadata for the user file in blocks of storage associated with the at least one metadata region and store the user data for the user file in blocks of storage associated with the at least one user data region.

26. A system according to claim 25, wherein the file server is further configured to selectively store a portion of system metadata in blocks of data associated with the at least one user data region when there is insufficient storage space in the at least one metadata region for storing the portion of system metadata.

27. A system according to claim 25, wherein the file server is further configured to store, for each of a second number of user files, both the user metadata and the user data for the user file in storage blocks associated with the at least one metadata region.

28. A system according to claim 25, wherein the at least one user data region includes a plurality of user data regions associated with different user data tiers, and wherein the file server is configured to store the user data for the user file by selecting a user data tier for the user data from among the plurality of user data tiers based on a predetermined storage policy and storing the user data for the user file in blocks of storage associated with the selected user data tier.

29. A system according to claim 28, wherein the file server is further configured to store, for each of a third number of user files, the user metadata and the user data for the user file in blocks of storage associated with different user data tiers, wherein the user data tier in which the user metadata is stored is associated with a hierarchically higher storage tier than the user data tier in which the user data is stored.

30. A system according to claim 28, wherein the file server is further configured to store, for each of a fourth number of user files, the user metadata and the user data for the user file in blocks of storage associated with the same user data tier.

31. A system according to claim 17, wherein the file server is further configured to migrate data between storage tiers based on a predetermined migration policy.

32. A system according to claim 17, wherein the file server is configured to manage the multi-tiered filesystem using a hierarchy of virtual storage constructs including system drives, ranges composed of one or more system drives, stripesets composed of one or more ranges, and spans composed of one or more stripesets, and wherein the file server is configured to manage storage tiers at the stripeset level such that each stripeset is associated with a storage tier and the multi-tiered filesystem integrates storage from stripesets associated with multiple storage tiers.

33. In a storage system having a storage pool including disk storage representing a lower storage tier and solid state storage device representing a higher storage tier, a method for converting a single-tiered filesystem into a multi-tiered filesystem, the single-tiered filesystem storing filesystem metadata and user files in disk storage, the method comprising:

allocating solid state storage for the filesystem from the storage pool;

aggregating the allocated solid state storage and the disk storage into a contiguous filesystem storage space such that at least two regions of the contiguous filesystem storage space are associated with different storage tiers; and upon creation of a new user file by the filesystem:

storing user metadata associated with the new user file in the solid state storage; and storing user data associated with the new user file in the disk storage, wherein at least one user file remains stored entirely in disk storage and wherein the storage system is operable to store the user data associated with the new user file into the disk storage forming the lower storage tier in the storage pool and to store the user metadata for managing the new user file into the solid state storage forming the higher storage tier in the storage pool based on the types of the storage devices and the type of the user data and the user metadata, the user metadata stored in the higher storage tier separately from the user data stored in the lower storage tier.

34. A method according to claim 33, further comprising: selectively migrating filesystem metadata from the disk storage to the solid state storage.

35. A method according to claim 33, further comprising: selectively converting a user file stored entirely in disk storage to a user file associated with user metadata stored in the higher storage tier separately from user data stored in the lower storage tier, such converting including moving at least a portion of the user metadata associated with the user file to the solid state storage.

36. A method according to claim 35, wherein such converting is performed upon a write to the user file.

37. A method according to claim 35, wherein such converting is performed upon a user access to the user file.

38. A file server comprising:

a storage pool including storage from at least two tiers of storage devices, the storage tiers having different storage characteristics; and a plurality of multi-tiered filesystems, each multi-tiered filesystem including storage from a plurality of the storage tiers aggregated into a contiguous filesystem storage space such that at least two regions of the contiguous filesystem storage space are associated with different storage tiers, wherein the file server is operable to store user data associated with a user file into at least one storage device forming a lower storage tier in the storage pool and to store user metadata for managing the user file into at least one storage device forming a higher storage tier in the storage pool based on the types of the storage devices and the type of the user data and the user metadata so that the user metadata can be stored in the higher storage tier separately from the user data stored in the lower storage tier.

39. A file server according to claim 38, wherein each multi-tiered filesystem is configured to selectively store filesystem metadata and user metadata in a first storage tier and to selectively store user data in a second storage tier.

* * * * *